US012761044B2

(12) United States Patent
Shiraishi et al.

(10) Patent No.: US 12,761,044 B2
(45) Date of Patent: Oct. 13, 2026

(54) INFORMATION PROCESSING APPARATUS, INFORMATION PROCESSING METHOD, AND MOBILE DEVICE

(71) Applicant: SONY GROUP CORPORATION, Tokyo (JP)

(72) Inventors: Junya Shiraishi, Tokyo (JP); Sora Endo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 143 days.

(21) Appl. No.: 18/693,969

(22) PCT Filed: Aug. 5, 2022

(86) PCT No.: PCT/JP2022/030196
§ 371 (c)(1),
(2) Date: Mar. 21, 2024

(87) PCT Pub. No.: WO2023/053723
PCT Pub. Date: Apr. 6, 2023

(65) Prior Publication Data

US 2024/0393132 A1 Nov. 28, 2024

(30) Foreign Application Priority Data

Oct. 1, 2021 (JP) ................................ 2021-162687

(51) Int. Cl.
*G01C 21/00* (2006.01)
*G06T 5/20* (2006.01)
(Continued)

(52) U.S. Cl.
CPC ...... *G01C 21/3837* (2020.08); *G01C 21/3811* (2020.08); *G06T 5/20* (2013.01);
(Continued)

(58) Field of Classification Search
CPC ... G01C 21/3837; G01C 21/3811; G06T 5/20; G06T 5/70; G06T 7/50; G06T 15/405;
(Continued)

(56) References Cited

U.S. PATENT DOCUMENTS

2012/0212489 A1* 8/2012 Fisk ........................ G06T 15/40 345/422
2020/0174129 A1* 6/2020 Abdelkader .......... B60B 19/006
(Continued)

FOREIGN PATENT DOCUMENTS

JP 2018-173707 A 11/2018
JP 2020-184148 A 11/2020
WO 2021/131990 A1 7/2021

OTHER PUBLICATIONS

International Search Report and Written Opinion of PCT Application No. PCT/JP2022/030196, issued on Oct. 25, 2022, 10 pages of ISRWO.

(Continued)

*Primary Examiner* — Hitesh Patel
*Assistant Examiner* — Ashleigh Nicole Turnbaugh
(74) *Attorney, Agent, or Firm* — CHIP LAW GROUP

(57) ABSTRACT

Provided is an information processing apparatus that efficiently creates a low-dimensional environmental map on the basis of high-dimensional sensor data. The information processing apparatus includes: an object construction unit that clusters sensor data including a high-dimensional point cloud and constructs a high-dimensional object for each cluster; a projection unit that subjects the high-dimensional object to low-dimensional projection; and a map construction unit that constructs a map on a basis of the object subjected to the low-dimensional projection. The object construction unit constructs a high-dimensional object having a size, a shape, and a posture based on geometric
(Continued)

information extracted from a set of sensor data included in a cluster.

18 Claims, 33 Drawing Sheets

(51) Int. Cl.
*G06T 5/70* (2024.01)
*G06T 7/50* (2017.01)
*G06T 15/40* (2011.01)
*G06T 17/05* (2011.01)

(52) U.S. Cl.
CPC .................. *G06T 5/70* (2024.01); *G06T 7/50* (2017.01); *G06T 15/405* (2013.01); *G06T 17/05* (2013.01); *G06T 2207/10028* (2013.01); *G06T 2207/30252* (2013.01); *G06T 2210/12* (2013.01); *G06T 2210/56* (2013.01)

(58) Field of Classification Search
CPC ........... G06T 17/05; G06T 2207/10028; G06T 2207/30252; G06T 2210/12; G06T 2210/56; G06T 2207/20021; G06T 7/521; G01S 17/89
USPC .......................................................... 701/420
See application file for complete search history.

(56) References Cited

U.S. PATENT DOCUMENTS

| | | | | |
|---|---|---|---|---|
| 2021/0150230 | A1* | 5/2021 | Smolyanskiy | G06V 10/803 |
| 2022/0270268 | A1* | 8/2022 | Radha | G06V 10/7715 |

OTHER PUBLICATIONS

Kaiming He Jian Sun, "Fast Guided Filter", arXiv, May 5, 2015, 2 pages.
Gutmann et al: "A Floor and Obstacle Height Map for 3D Navigation of a Humanoid Robot", Robotics and Automation, 2005. Proceedings of the 2005 IEEE International Conference on Barcelona, Spain Apr. 2005,Piscataway, NJ, USA,IEEE,Apr. 18, 2005 (Apr. 18, 2005), pp. 1066-1071, XP010872097.
Lim Hyungtae et al: "Patchwork:Concentric zone-Based Region-Wise Ground Segmentation With Ground Likelihood Estimation Using a 3D LiDAR Sensor",IEEE Robotics and Automation Letters,IEEE,vol. 6, No. 4, pp. 6458-6465, XP011867540.
Luc Anselin, "Dimension Reduction Methods (1) Principal Components Analysis",Jul. 29, 2020 (Jul. 29, 2020), pp. 1-19, XP093229543.
Yao Duan et al: "Low-complexity Point Cloud Filtering for LiDAR by PCA-based Dimension Reduction", arxiv.org, Cornell University Library, 201 Olin Library Cornell University Ithaca, NY14853,Jul. 28, 2020 (Jul. 28, 2020), XP081728396.

* cited by examiner

INFORMATION PROCESSING APPARATUS, INFORMATION PROCESSING METHOD, AND MOBILE DEVICE

CROSS REFERENCE TO RELATED APPLICATIONS

This application is a U.S. National Phase of International Patent Application No. PCT/JP2022/030196 filed on Aug. 5, 2022, which claims priority benefit of Japanese Patent Application No. JP 2021-162687 filed in the Japan Patent Office on Oct. 1, 2021. Each of the above-referenced applications is hereby incorporated herein by reference in its entirety.

TECHNICAL FIELD

The technology disclosed in this specification (hereinafter, "the present disclosure") relates to an information processing apparatus, an information processing method, and a mobile device that perform processing for creating an environmental map.

BACKGROUND ART

Conventionally, a mobile device that autonomously moves, such as a walking robot and a transport vehicle, has been developed. In order to realize autonomous movement by the mobile device, an environmental map or an obstacle map (hereinafter, the map is unified to "environmental map") representing a region where an object such as an obstacle exists and a region where no object exists in the moving space is required. Moreover, in the case of a legged robot having high traversing performance in a place having stairs or unevenness, it is preferable that the environmental map is a 2.5 dimensionally expressed environmental map including height information in preparation for a moving space having a slope or a step.

For example, an information processing apparatus that creates an environmental map including height information on the basis of three-dimensional sensor data obtained from a three-dimensional distance sensor has been proposed (see Patent Document 1). The information processing apparatus creates a first environmental map based on first detection data in a first height range, acquires second detection data in a second height range, creates a superimposed image in which a projection image of third detection data in a third height range acquired from the second detection data is superimposed on the first environmental map, and creates a second environmental map by setting an entry prohibited area based on the superimposed image to the first environmental map.

However, since the three-dimensional sensor data is a huge amount of data including an infinite number of three-dimensional point clouds, the amount of calculation is enormous to create an environmental map including height information from the three-dimensional sensor data. For example, a desktop personal computer (PC) or a cloud equipped with a central processing unit (CPU) capable of high-speed operation or a graphics processing unit (GPU) capable of parallel operation and a large-capacity memory system can cope with a huge amount of data and an enormous amount of operation. On the other hand, an embedded device such as a small robot cannot be said to be rich in calculation resources, and thus, it is difficult to create a low-dimensional environmental map on the basis of high-dimensional sensor data.

CITATION LIST

Patent Document

Patent Document 1: Japanese Patent Application Laid-Open No. 2020-184148

Patent Document 2: WO 2021/131990 A

Non-Patent Document

Non-Patent Document 1: "Fast Guided Filter" Kaming He Jian Sun, arXiv:1505.00996v1 [cs.CV] 5 May 2015

SUMMARY OF THE INVENTION

Problems to be Solved by the Invention

An object of the present disclosure is to provide an information processing apparatus, an information processing method, and a mobile device that efficiently create a low-dimensional environmental map on the basis of high-dimensional sensor data.

Solutions to Problems

The present disclosure has been made in view of the above-described problems, and a first aspect thereof is an information processing apparatus including: an object construction unit that clusters sensor data including a high-dimensional point cloud and constructs a high-dimensional object for each cluster; a projection unit that subjects the high-dimensional object to low-dimensional projection; and a map construction unit that constructs a map on a basis of an object that has been subjected to the low-dimensional projection.

The object construction unit constructs a high-dimensional object having a size, a shape, and a posture based on geometric information extracted from a set of sensor data included in a cluster.

The projection unit orthogonally projects the high-dimensional object onto a reference plane parallel to a ground to generate a low-dimensional object. Then, the map construction unit constructs a low-dimensional map on the basis of the object.

The information processing apparatus according to the first aspect further includes a hidden surface removal unit that performs hidden surface removal processing on the object that has been subjected to the low-dimensional projection by the projection unit. The hidden surface removal unit performs the hidden surface removal processing using a Z buffer that stores height information or an index of the height information.

The projection unit holds information necessary for height estimation among high-dimensional information of an object when the projection unit subjects the high-dimensional object to low dimensional projection, and the map construction unit may construct an environmental map to which a height estimated on the basis of the held information is assigned.

Furthermore, a second aspect of the present disclosure is an information processing method including: an object construction step of clustering sensor data including a high-dimensional point cloud and constructing a high-dimensional object on a basis of geometric information extracted from a cluster; a projection step of subjecting the high-dimensional object to low-dimensional projection; and a map construction step of constructing a map on a basis of an object that has been subjected to the low-dimensional projection.

Furthermore, a third aspect of the present disclosure is a mobile device including: a main body; a moving unit that moves the main body; a sensor mounted on the main body; a map construction unit that constructs an environmental map on the basis of sensor data from the sensor; a route planning unit that plans a route on the basis of the environmental map; and a control unit that controls an operation of the moving unit on the basis of the planned route, in which the map construction unit clusters the sensor data including a high-dimensional point cloud, and constructs a map on the basis of an object obtained by reducing a dimension of a high-dimensional object constructed on the basis of geometric information extracted from a cluster.

Effects of the Invention

According to the present disclosure, it is possible to provide an information processing apparatus, an information processing method, and a mobile device that reduce a data amount and a calculation amount when a low-dimensional environmental map is created from high-dimensional sensor data.

Note that the effects described in the present description are merely examples, and the effects brought by the present disclosure are not limited thereto. Furthermore, the present disclosure may further provide additional effects in addition to the effects described above.

Still other objects, features, and advantages of the present disclosure will become apparent from a more detailed description based on embodiments as described later and the accompanying drawings.

MODE FOR CARRYING OUT THE INVENTION

Hereinafter, the present disclosure will be described in the following order with reference to the drawings.

A. Overview
B. System configuration
C. Examples
D. Application example to robot

A. OVERVIEW

In order to create an environmental map including height information from three-dimensional sensor data, both the amount of data and the amount of calculation are enormous. Therefore, it is difficult to realize the creation of the environmental map by real-time processing with limited calculation resources allowed by a small robot. Of course, even in a high-performance calculation system equipped with a high-performance processor and a large-capacity memory system, it is not easy to realize the creation of the environmental map by real-time processing, and there are cases where the creation is handled by reducing the resolution and frame rate of the three-dimensional sensor and reducing the data amount. Therefore, it is desirable to drastically reduce the data amount and the calculation amount in order to realize the real-time processing of creating the environmental map regardless of the magnitude of the calculation resources.

Therefore, in the present disclosure, when a low-dimensional environmental map is created from high-dimensional sensor data, first, only geometric information is extracted by clustering the high-dimensional sensor data. That is, in the present disclosure, one or more objects having geometric information regarding a size, a shape, and a posture therein are created on the basis of original high-dimensional sensor data, and projection processing and mapping processing are performed by utilizing the geometric information of the objects. Therefore, as compared with a case where the three-dimensional sensor data is used as it is, the amount of data and the amount of computation handled in the subsequent projection processing and mapping processing can be greatly reduced.

Moreover, in the present disclosure, memory access and a calculation amount are reduced by using a hidden surface removal and rasterizing method using a Z buffer which is rendering processing of 3D computer graphics (3DCG) in projection processing on an object.

Therefore, according to the present disclosure, it is possible to generate the environmental map including the height information in real time even in a calculation system with limited calculation resources, such as an embedded device such as a small robot. Furthermore, according to the present disclosure, feedback of three-dimensional space information can be performed in real time even in a calculation system with limited calculation resources.

B. SYSTEM CONFIGURATION

Figure 1:
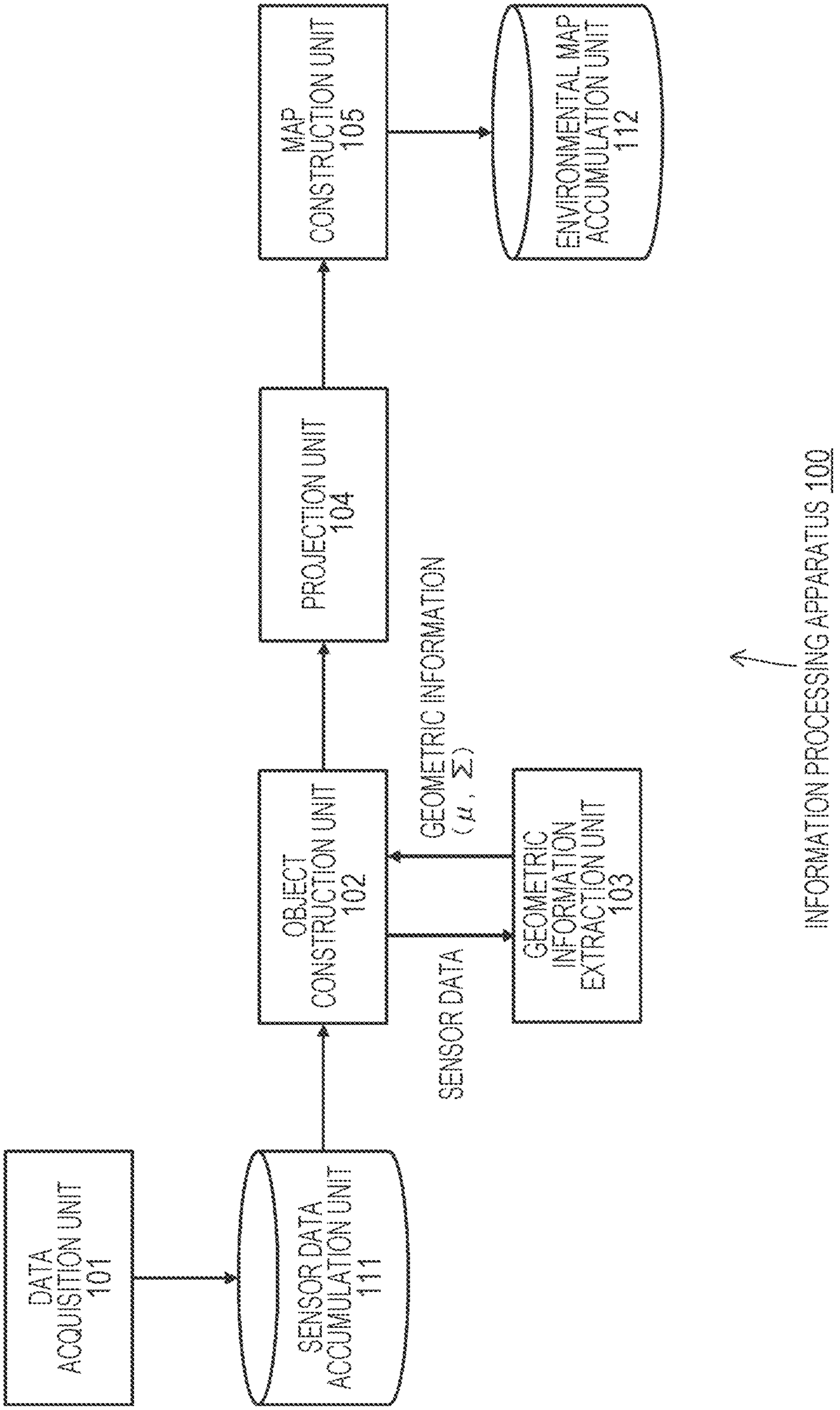
FIG. 1 is a diagram illustrating a functional configuration of an information processing apparatus 100 that performs environmental map creation processing to which the present disclosure is applied.

FIG. 1 schematically illustrates a basic functional configuration of an information processing apparatus 100 that performs environmental map creation processing to which the present disclosure is applied. The illustrated information processing apparatus 100 includes functional modules of a data acquisition unit 101, an object construction unit 102, a geometric information extraction unit 103, a projection unit 104, and a map construction unit 105. Each of these functional modules 101 to 105 may be, for example, a software module realized by executing a software program on a personal computer (PC), or may be a hardware module realized by a dedicated circuit.

The data acquisition unit 101 acquires sensor data including a high-dimensional point cloud from, for example, a sensor (not illustrated in FIG. 1) mounted on a small robot. The sensor here is, for example, a depth camera, a light detection and ranging (LiDAR), a distance measurement sensor, a stereo camera, or the like. This type of sensor is a sensor mainly intended to measure a distance to a surrounding object, and acquires a three-dimensional point cloud by capturing a reflected signal or reflected light from an object in a visual field, and outputs the three-dimensional point cloud at each predetermined frame rate. In short, the data acquisition unit 101 acquires sensor data of a large number of three-dimensional point clouds for each frame rate from this type of sensor. Alternatively, the data acquisition unit 101 may be any of the sensors described above. The three-dimensional sensor data acquired by the data acquisition unit 101 is temporarily stored in a sensor data accumulation unit 111.

The object construction unit 102 clusters sensor data including a large number of high-dimensional point clouds accumulated in the sensor data accumulation unit 111. As a result, in the subsequent processing, the high-dimensional point cloud can be handled in cluster units, and the processing load can be greatly reduced as compared with the case of processing the high-dimensional point cloud as it is. For example, a technique of clustering a point cloud by near point search is known. However, since calculation resources are limited (described above), it is preferable to perform clustering of the point cloud with a low processing load and a short processing time.

The geometric information extraction unit 103 analyzes a high-dimensional point cloud included in the cluster, and extracts geometric information regarding the size, shape, and posture of a high-dimensional object corresponding to the cluster. Specifically, the geometric information extraction unit 103 performs principal component analysis (PCA) on the high-dimensional sensor data included in the cluster to obtain an average p and a variance-covariance matrix (covariance) Z.

Then, the object construction unit 102 constructs a high-dimensional object having a size, a shape, and a posture based on the geometric information extracted from the high-dimensional point cloud included in the cluster by the geometric information extraction unit 103. Hereinafter, a cluster including a high-dimensional point cloud can be treated as one high-dimensional object. In the present embodiment, the object construction unit 102 constructs a high-dimensional object including an ellipsoid defined by an average p and a covariance Z obtained by principal component analysis for a cluster. The ellipsoid is centered on the mean p. Furthermore, the covariance Z is subjected to eigenvalue decomposition, the eigenvector is defined as the inclination of the ellipsoid, and each eigenvalue is defined as the length of the major axis and the length of the minor axis of the ellipse. Therefore, the object construction unit 102 can greatly reduce the amount of data by expressing the original high-dimensional point cloud as an object having a simple high-dimensional shape such as an ellipsoid by clustering and geometric information extraction.

The projection unit 104 orthogonally projects the high-dimensional object constructed by the object construction unit 102 in low dimensions. Specifically, the projection unit 104 projects the ellipsoid object constructed by the object construction unit 102 onto the reference plane. Here, the reference plane is a plane parallel to the ground, and an axis (z axis) orthogonal to the reference plane is defined as a height. Furthermore, for example, an object is projected by an orthogonal projection operation. For example, by the projection processing by the projection unit 104, an ellipsoid that is a three-dimensional object representing a cluster is orthogonally projected onto a reference plane and converted into a two-dimensional object made of an ellipsoid flat plate. Since the original three-dimensional sensor data is a two-dimensional object including an ellipsoid flat plate on the reference plane, the data amount is greatly reduced. However, among the three-dimensional information of the three-dimensional object before orthogonal projection, information necessary for height estimation in the subsequent processing is held.

The map construction unit 105 constructs the environmental map by assigning height information to each point of the low-dimensional object formed of the ellipsoid flat plate on the reference plane on the basis of the height information of the high-dimensional object before the low-dimensional projection. For example, the map construction unit 105 searches for a three-dimensional object nearest to a query point to be estimated in height on the basis of, for example, a KD-tree or a Mahalanobis distance. Then, the found three-dimensional object is approximated to an ellipsoid flat plate on the three-dimensional space, and the height from the query point on the reference plane to the approximated ellipsoid flat plane is calculated. Furthermore, the reliability of the height information calculated at the query point is calculated from the variance in the thickness direction of the three-dimensional object before projection. Then, the map construction unit 105 outputs the constructed low-dimensional environmental map to an environment accumulation unit 112.

Note that processing from acquisition of sensor data to construction of the environmental map by the information processing apparatus 100 is performed at a frame rate of the sensor, for example.

Figure 2:
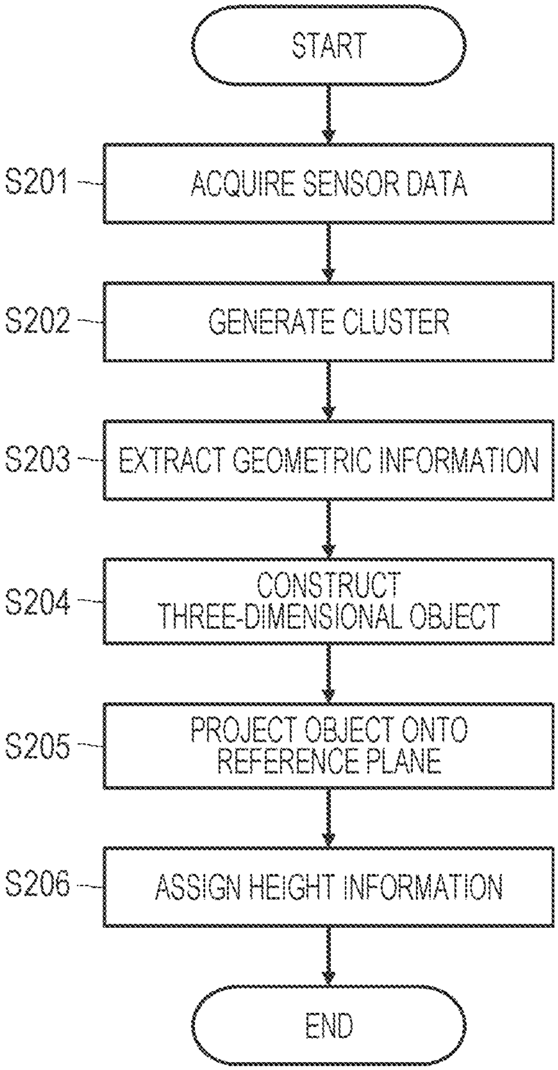
FIG. 2 is a flowchart illustrating a processing procedure for creating an environmental map from sensor data including a large number of three-dimensional point clouds in the information processing apparatus 100.

FIG. 2 illustrates a processing procedure for creating an environmental map from sensor data including a large number of high-dimensional point clouds in the information processing apparatus 100 in the form of a flowchart. The illustrated processing procedure is repeatedly performed, for example, for each predetermined frame rate.

First, the data acquisition unit 101 acquires sensor data including a large number of three-dimensional point clouds from sensors such as a depth camera, a LiDAR, a distance measurement sensor, and a stereo camera mounted on, for example, a small robot, and accumulates the sensor data in the sensor data accumulation unit 111 (step S201).

Next, the object construction unit 102 clusters the sensor data of the enormous high-dimensional point cloud accumulated in the sensor data accumulation unit 111 to generate one or more clusters including the high-dimensional point cloud (step S202).

Next, the geometric information extraction unit 103 analyzes the high-dimensional point cloud included in the cluster, and extracts geometric information regarding a size, a shape, and a posture of the high-dimensional object corresponding to the cluster (step S203). Specifically, the geometric information extraction unit 103 performs principal component analysis on the three-dimensional sensor data included in the cluster to obtain an average p and a covariance Z.

Next, the object construction unit 102 constructs a high-dimensional object having a size, a shape, and a posture based on the geometric information extracted from the high-dimensional point cloud included in the cluster by the geometric information extraction unit 103 (step S204). Specifically, the object construction unit 102 constructs an ellipsoid based on the average p and the covariance Z calculated in step S203 as a three-dimensional object corresponding to a cluster.

Next, the projection unit 104 orthogonally projects the high-dimensional object constructed by the object construction unit 102 onto the low-dimensional plane (step S205). Specifically, the projection unit 104 orthogonally projects the ellipsoid object constructed by the object construction unit 102 onto a reference plane parallel to the ground, and converts the ellipsoid object into a two-dimensional object including an ellipsoid flat plate on the reference plane.

Next, the map construction unit 105 constructs an environmental map by assigning height information to each point of the low-dimensional object subjected to the low-dimensional projection on the basis of the height information before projection (step S206). Specifically, when the height information is assigned to each point of the two-dimensional object made of the ellipsoid flat plate on the reference plane, the three-dimensional object closest to the query point to be subjected to the height calculation is approximated to the ellipsoid flat plate, and the height from the query point on the reference plane to the approximated ellipsoid plane is approximately calculated. Furthermore, the reliability of the height information calculated at the query point is calculated from the variance in the thickness direction of the three-dimensional object before projection.

Next, each process performed to create the environmental map in the information processing apparatus 100 will be described in detail with appropriate reference to the drawings.

Figure 3:
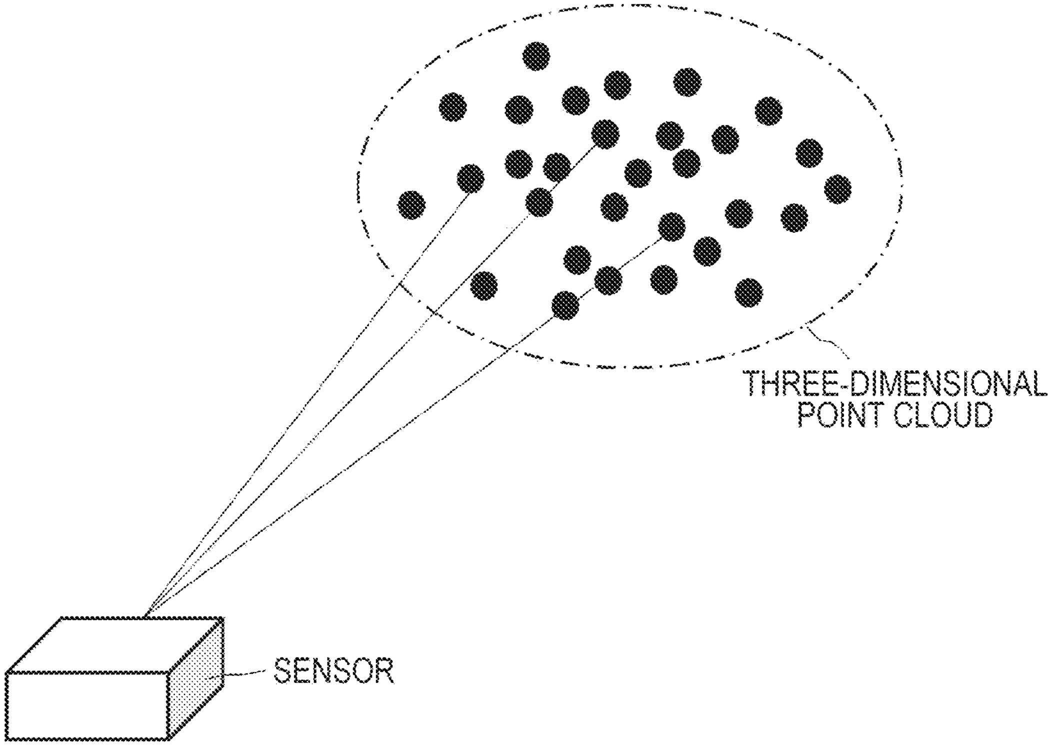
FIG. 3 is a diagram illustrating a three-dimensional point cloud acquired by a data acquisition unit 101.

Data Acquisition:

The data acquisition unit 101 acquires sensor data including a large number of three-dimensional point clouds as illustrated in FIG. 3 from a sensor such as a depth camera, a LiDAR, a distance measurement sensor, or a stereo camera mounted on, for example, a small robot. The depth camera, the LiDAR, and the distance measurement sensor detect a reflected signal or reflected light from an object in the visual field to output the three-dimensional point cloud at each frame rate. Furthermore, in the case of the stereo camera, the depth of the object in the field of view is estimated on the basis of the left image and the right image captured in synchronization with each other by the left and right cameras, and a similar three-dimensional point cloud is output.

Clustering:

The object construction unit 102 clusters sensor data including a large number of three-dimensional point clouds. For example, a technique of clustering a point cloud by near point search is known. However, since calculation resources are limited (described above), it is preferable to perform clustering of the point cloud with a low processing load and a short processing time. Therefore, for example, on the basis of the method disclosed in Patent Document 2, clustering of the point cloud may be performed with a low processing load and a short processing time. A clustering method used in the present embodiment will be briefly described.

First, whether to divide a large number of three-dimensional point clouds acquired by the data acquisition unit 101 is determined on the basis of a predetermined division condition, and the point cloud is divided until the division condition is no longer satisfied. The division condition here includes one or more of a condition for the number of points included in the point cloud, a condition for the size of the region surrounding the point cloud, a condition for the density of points in the point cloud, and a condition of the point cloud.

Then, the point cloud that no longer satisfies the division condition is determined on the basis of a predetermined clustering condition, and clustering is performed in a case where the clustering condition is satisfied. The clustering condition here includes one or more of a condition for the number of points included in the point cloud, a condition for the size of the region surrounding the point cloud, a condition for the density of points in the point cloud, and a condition of the point cloud.

Figure 4:
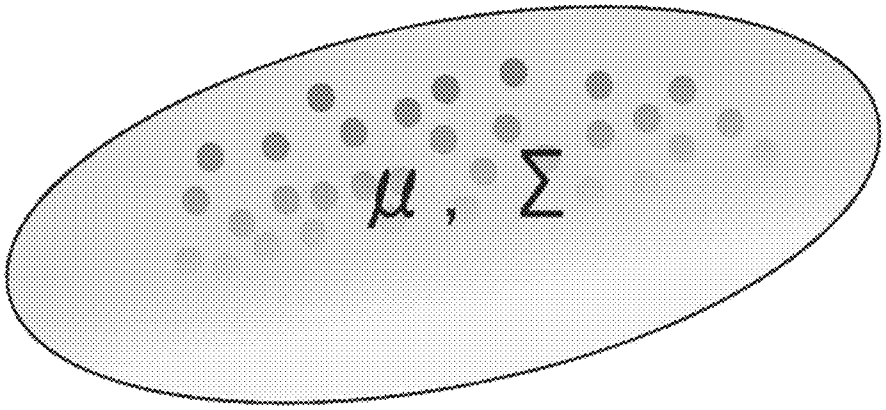
FIG. 4 is a diagram illustrating a three-dimensional object (ellipsoid) representing a cluster.

Object Construction:

The geometric information extraction unit 103 analyzes a set of three-dimensional sensor data included in the cluster, and extracts geometric information on the size, shape, and posture of the object corresponding to the cluster. Specifically, the geometric information extraction unit 103 performs principal component analysis on the three-dimensional sensor data included in the cluster to obtain an average p and a covariance Z. Then, the object construction unit 102 constructs a three-dimensional object including an ellipsoid defined by an average p and a covariance Z as illustrated in FIG. 4. The ellipsoids illustrated in the drawing are centered on an average p. Furthermore, the covariance Z is subjected to eigenvalue decomposition, the eigenvector is defined as the inclination of the ellipsoid, and each eigenvalue is defined as the length of the major axis and the length of the minor axis of the ellipse.

Figure 5:
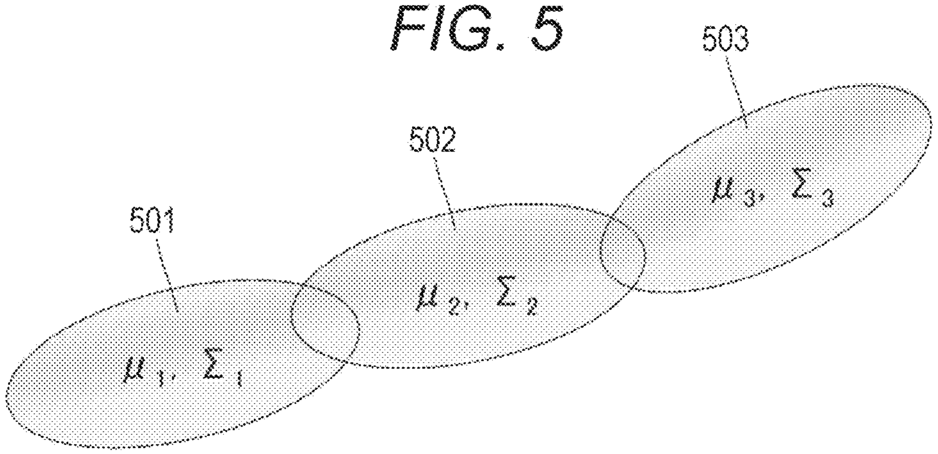
FIG. 5 is a diagram illustrating a state in which a plurality of clusters obtained by clustering a three-dimensional point cloud is represented by a three-dimensional object.

Furthermore, FIG. 5 illustrates a state in which three consecutive objects 501, 502, and 503 are constructed by clustering a large number of original three-dimensional point clouds. The object 501 is an ellipsoid constructed on the basis of the average value $\mu_1$ and the covariance $\Sigma_1$, the object 502 is an ellipsoid constructed on the basis of the average value $\mu_2$ and the covariance $\Sigma_2$, and the object 503 is an ellipsoid constructed on the basis of the average value $\mu_3$ and the covariance $\Sigma_3$.

In the subsequent processing, the data amount can be greatly reduced by using a three-dimensional object constructed on the basis of clustering and geometric information extraction of each cluster instead of the original large number of three-dimensional point clouds.

Low-Dimensional Projection:

The projection unit 104 orthographically projects one or more three-dimensional objects constructed by the object construction unit 102 onto a reference plane parallel to the ground. Here, an axis (z axis) orthogonal to the reference plane is defined as a height. As a result of the orthogonal projection, the three-dimensional object is reduced in dimension to a two-dimensional object on the reference plane, and the data amount can be further reduced. However, among the three-dimensional information of the three-dimensional object before orthogonal projection, information necessary for height estimation in the subsequent map construction processing is held. Examples of the information necessary for the height estimation include the expected value and variance of the three-dimensional point cloud data included in each three-dimensional object, and the normal vector of the object.

Figure 6:
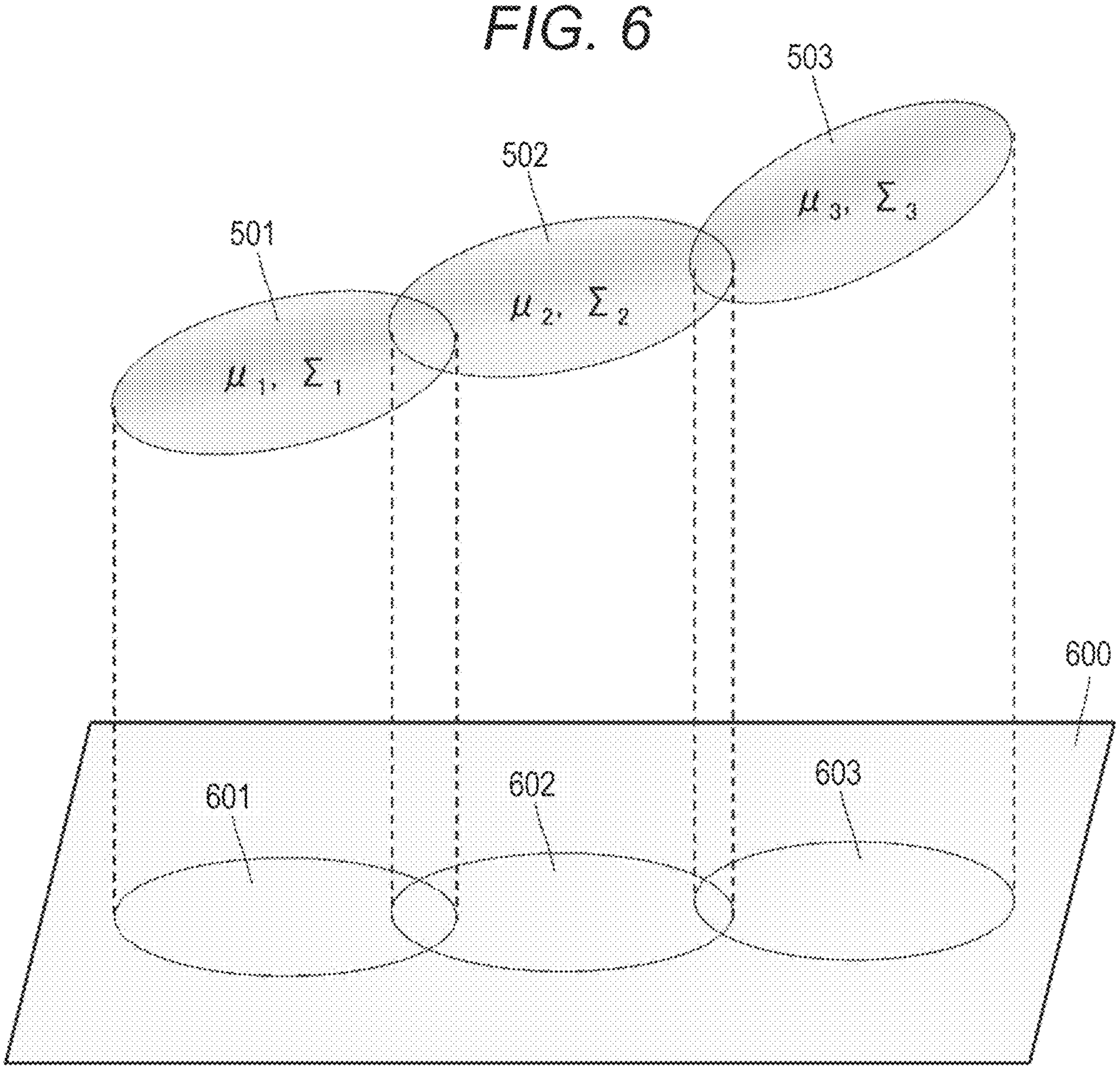
FIG. 6 is a diagram illustrating a state in which the plurality of three-dimensional objects illustrated in FIG. 5 is orthogonally projected on a reference plane.

FIG. 6 illustrates a state in which the three three-dimensional objects 501, 502, and 503 illustrated in FIG. 5 are orthogonally projected onto a reference plane 600. As illustrated in FIG. 6, the three ellipsoids 501, 502, and 503 are orthogonally projected onto the ellipsoid flat plates 601, 602, and 603, respectively, on the reference plane 600.

Construction of Environmental Map (Assignment of Height Information):

The map construction unit 105 constructs an environmental map by assigning height information to each point of a two-dimensional object formed of an ellipsoid flat plate on a reference plane on the basis of the height information of the three-dimensional object before orthogonal projection.

Figure 7:
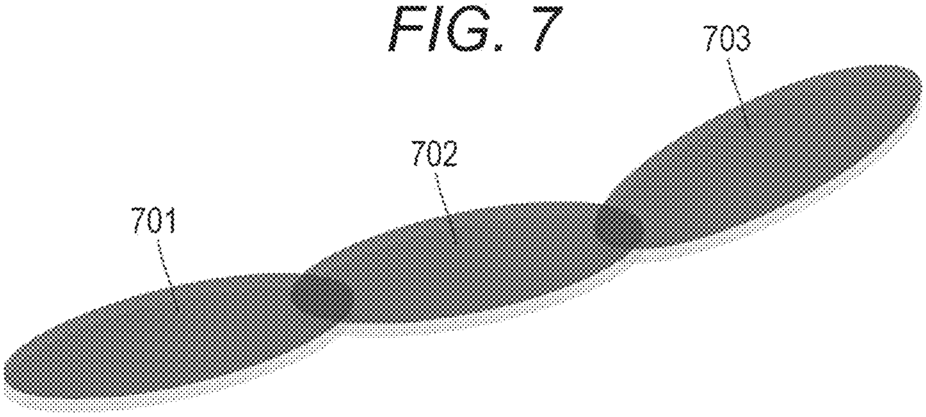
FIG. 7 is a diagram illustrating a state in which the three-dimensional objects illustrated in FIG. 5 are approximated by a flat plate.

In the estimation calculation of the height information, the map construction unit 105 approximates each three-dimensional object before orthogonal projection to a flat plate on a three-dimensional space. In the example illustrated in FIG. 5, the three ellipsoid objects 501, 502, and 503 are approximated to ellipsoid flat plates 701, 702, and 703 in a three-dimensional space, respectively, as illustrated in FIG. 7.

Next, the map construction unit 105 searches for a three-dimensional object nearest to a query point to be subjected to height estimation on the basis of, for example, a KD-tree or a Mahalanobis distance. In the example illustrated in FIG. 6, in a case where the query point is within the ellipsoid flat plate 602 on the reference plane 600, the nearest ellipsoid flat plate 702 is searched for.

Then, the map construction unit 105 linearly interpolates the expected value of the height information from the point corresponding to the query point on the approximate ellipsoid flat plate 702 to calculate the expected value. Furthermore, the map construction unit 105 calculates the variance in the thickness direction of the original ellipsoid object 502 at the point corresponding to the query point on the approximate ellipsoid flat plate 702 as the reliability of the height information calculated at the query point. The variance in the thickness direction may be simply calculated by low-dimensionally projecting the variance in the normal direction of the approximate ellipsoid flat plate 702 in the z direction.

Figure 8:
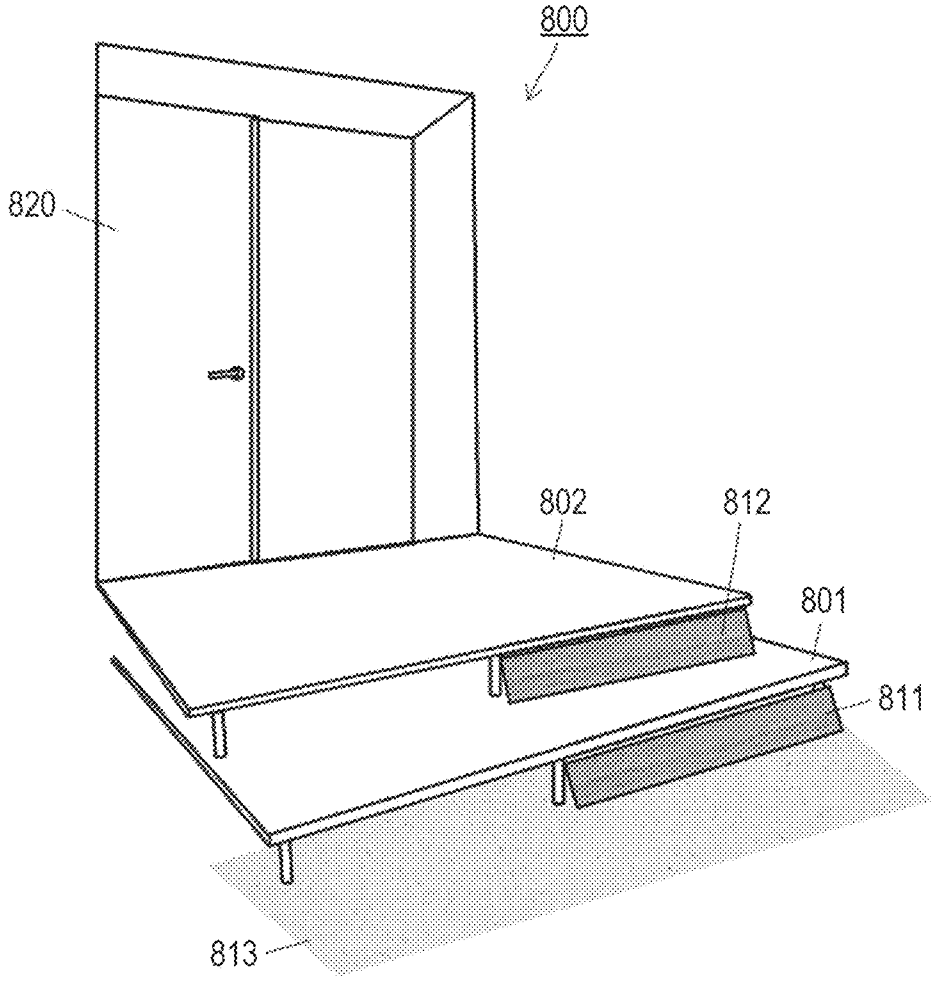
FIG. 8 is a diagram illustrating an environment as a target of map construction.

Experimental Results:

A specific example of creating an environmental map using the information processing apparatus 100 according to the present embodiment will be described. Here, it is assumed that an environmental map near the entrance 800 of the building as illustrated in FIG. 8 is created. The entrance 800 has two steps, and the door 820 is at the innermost part of the second step. Note that the kick-up of each of the steps 801 and 802 is about 16 cm, and the depth of the tread of the first step 801 is about 40 cm. Furthermore, carpets are laid on the floor surface 813, fabrics are laid on the treads of the respective steps, and wood risers 811 and 812 are provided to prevent the toes from being caught on the treads. The data acquisition unit 101 acquires sensor data including a three-dimensional point cloud in which the staircase illustrated in FIG. 8 is captured by a sensor such as a depth camera, LiDAR, a distance measurement sensor, or a stereo camera.

Figure 9:
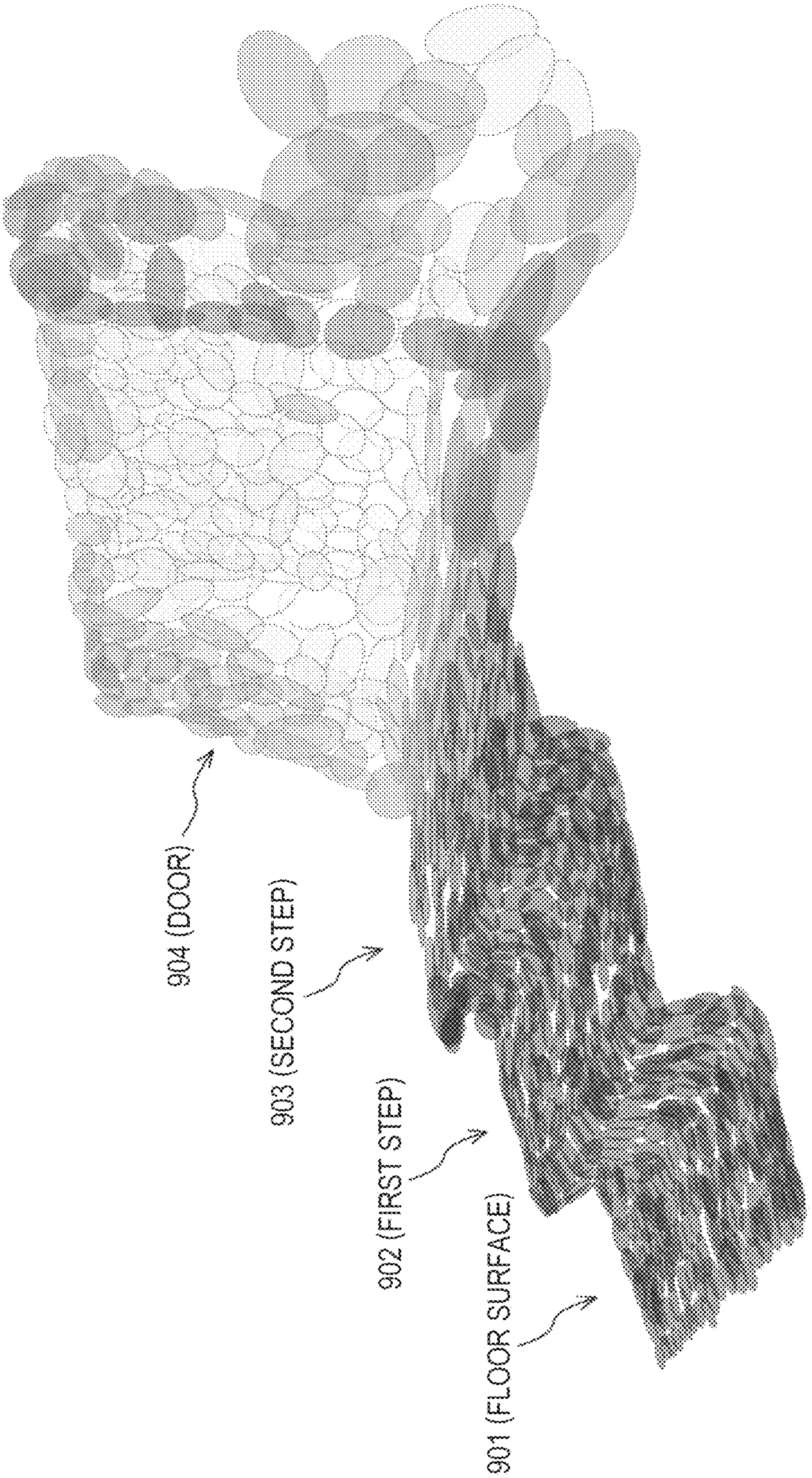
FIG. 9 is a diagram illustrating a three-dimensional object constructed from the environment illustrated in FIG. 8.

FIG. 9 illustrates a state in which sensor data including a three-dimensional point cloud capturing the environment illustrated in FIG. 8 is clustered by the object construction unit 102 to construct a large number of ellipsoid objects. In order from the front side, the floor surface, the first stair step and the riser plate, the second stair step and the riser plate, and the innermost door are respectively expressed by sets 901, 902, 903, and 904 of ellipsoid objects.

Figure 10:
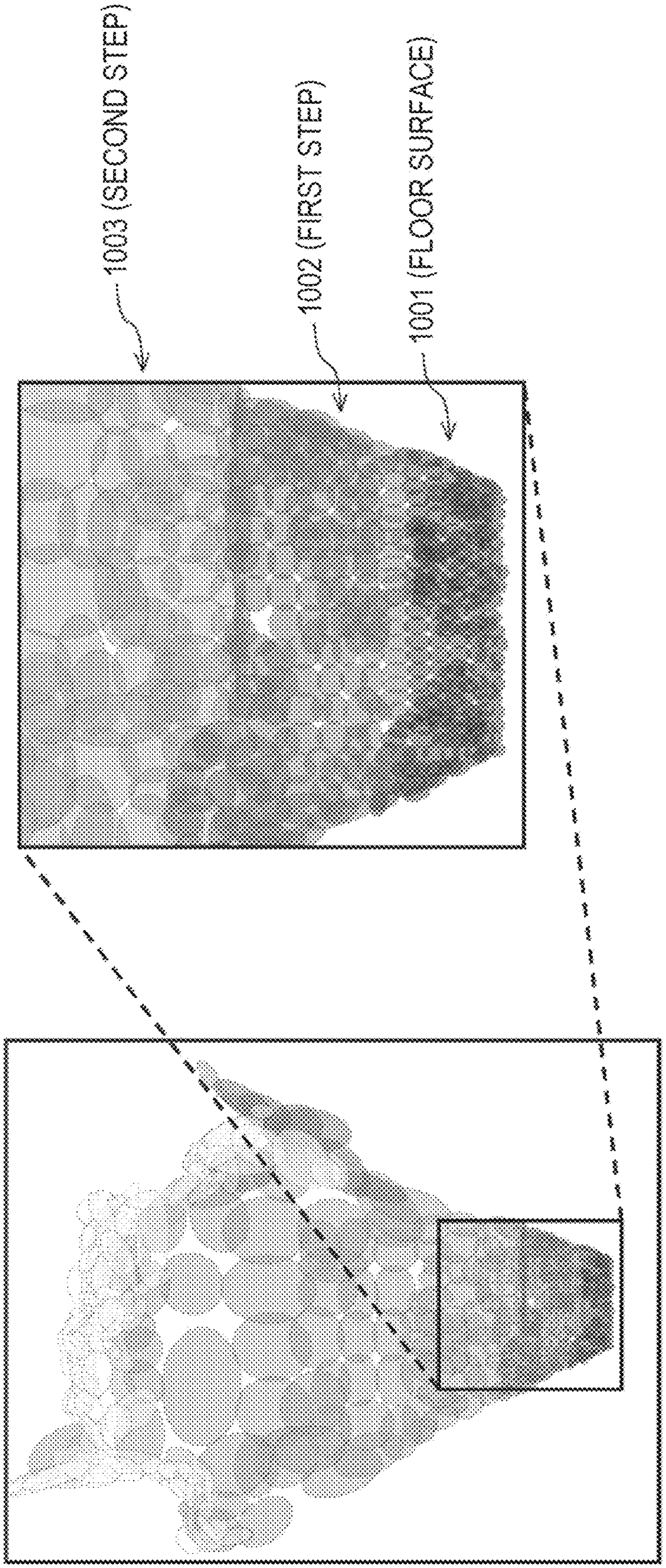
FIG. 10 is a diagram illustrating a state in which the three-dimensional object illustrated in FIG. 9 is low-dimensionally projected on a reference plane.

FIG. 10 illustrates a state in which each three-dimensional object illustrated in FIG. 9 is subjected to low-dimensional projection by orthogonal projection on a reference plane parallel to the ground. Furthermore, on the right side of FIG. 10, the floor surface 1001 near the front, the first step 1002 and the second step 1003 of the staircase are illustrated in an enlarged manner.

Figure 11:
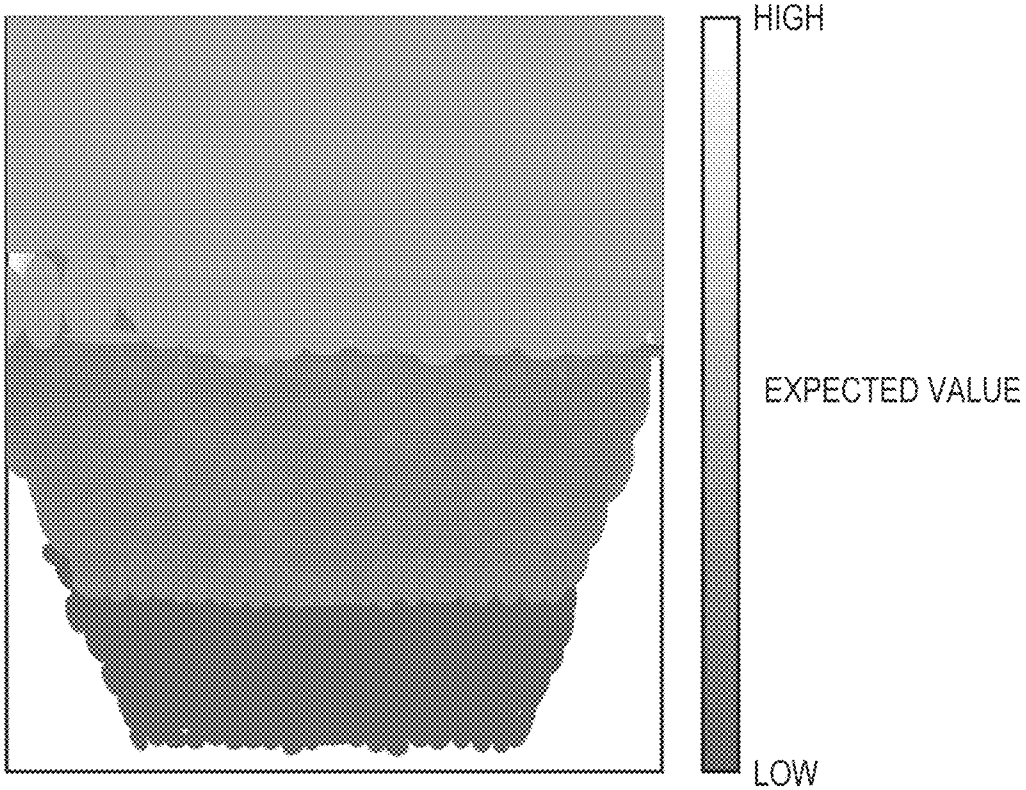
FIG. 11 is a diagram illustrating a result of estimating an expected value of height from a low-dimensional projection image illustrated in FIG. 10.

The map construction unit 105 constructs the environmental map by assigning height information to each point of the two-dimensional object that is low-dimensionally projected on the reference plane. The map construction unit 105 estimates the expected value of the height at the query point of the two-dimensional object by linear interpolation on an ellipsoid flat plate approximating the three-dimensional elliptic object. FIG. 11 illustrates a result of calculating the expected value of the height estimated by linear interpolation from the low-dimensional projection image illustrated on the right side of FIG. 10. In FIG. 11, a two-dimensional object having a low expected value is drawn in a dark color, a two-dimensional object having a high expected value is drawn in a light color, and shading is expressed separately on the basis of the expected value of height. Therefore, it is possible to visually grasp the floor surface near the front and the first and second steps of the stairs.

Figure 12:
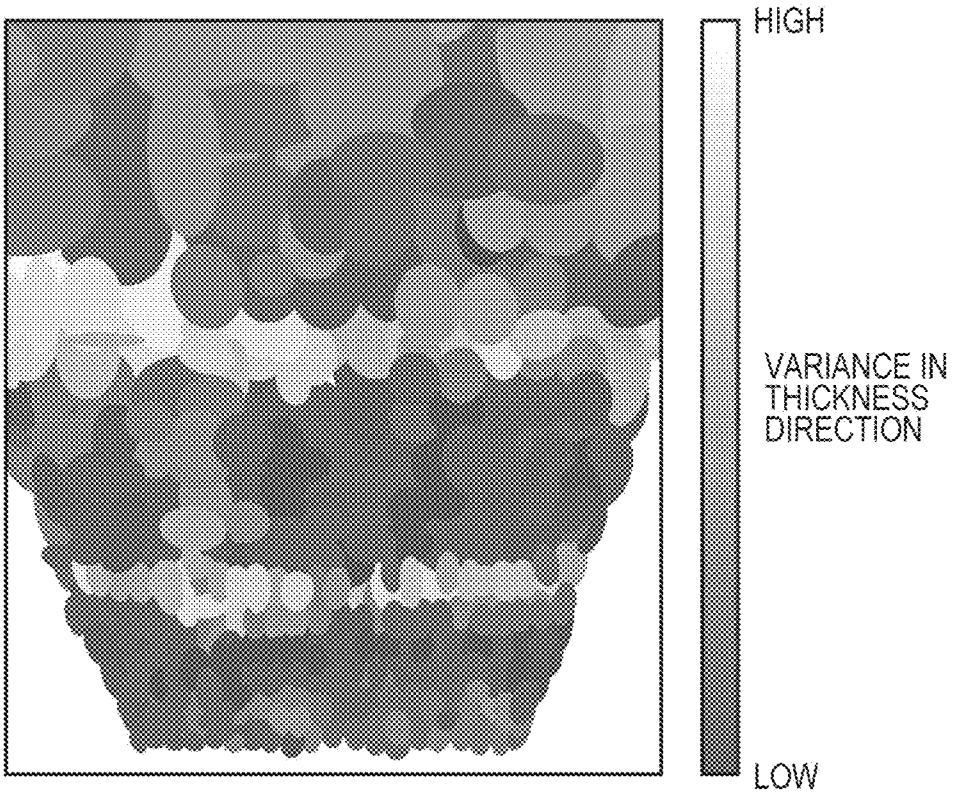
FIG. 12 is a diagram illustrating a result of calculating variance in a thickness direction from the low-dimensional projection image illustrated in FIG. 10.

Furthermore, FIG. 12 illustrates a result of calculating the variance from the low-dimensional projection image illustrated on the right of FIG. 10. The variance can be obtained by low-dimensionally projecting variance in the thickness direction at the point corresponding to the query point of the original high-dimensional object (ellipsoid) onto the z axis. In FIG. 12, a two-dimensional object having a small variance is drawn in a dark color, a two-dimensional object having a large variance is drawn in a light color, and shading is expressed separately on the basis of the magnitude of the variance. In the example illustrated in FIG. 12, the variance is large in the vicinity of the step of the staircase or in a place where the staircase hangs. A place where the variance is large can be said to be a place where the reliability is low and the risk is large. In FIG. 12, the variance is large in the vicinity of the step of the staircase or in a place where the staircase is hung, in other words, it is indicated that the cost for traversing is high.

Referring to FIGS. 10 to 12, the floor surface and the flat portion of the staircase can stably reproduce the original environment. On the other hand, the variance becomes large in the vicinity of the step of the staircase, which indicates that the risk is high. Furthermore, although the variance of the second step of the staircase appears to be slightly large, it is considered that improvement is achieved by the robot moving forward and adding the sensor data of the second step of the staircase.

C. EXAMPLES

In the above-described section B, the basic configuration and operation of the information processing apparatus 100 that performs the creation processing of the environmental map have been described. In this section C, examples of an information processing apparatus that further reduces the amount of data and the amount of computation in the environmental map creation process will be described.

C-1. First Example

Figure 13:
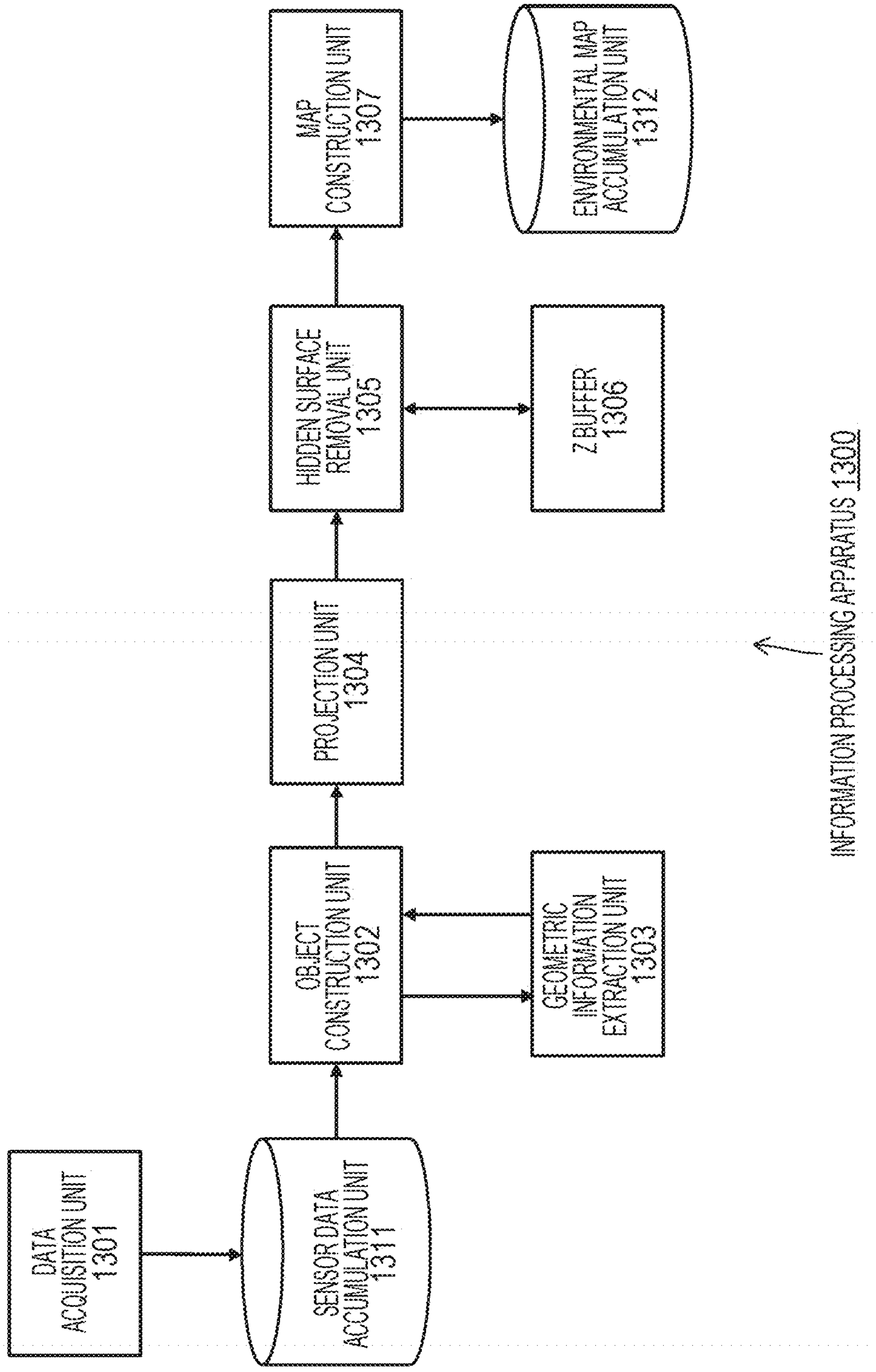
FIG. 13 is a diagram illustrating a functional configuration of an information processing apparatus 1300 according to a first example.

FIG. 13 illustrates a functional configuration of the information processing apparatus 1300 according to the first example. The illustrated information processing apparatus 1300 includes functional modules of a data acquisition unit 1301, an object construction unit 1302, a geometric information extraction unit 1303, a projection unit 1304, a hidden surface removal unit 1305, a Z buffer 1306, and a map construction unit 1307. However, since the data acquisition unit 1301, the object construction unit 1302, the geometric information extraction unit 1303, the projection unit 1304, and the map construction unit 1307 are the same as the functional modules having the same names of the information processing apparatus 100 illustrated in FIG. 1, detailed description thereof is omitted here.

When the projection unit 1304 orthogonally projects a plurality of three-dimensional objects onto the reference plane to make the plurality of three-dimensional objects two-dimensional, the hidden surface removal unit 1305 performs processing of erasing a portion that becomes a shadow of another two-dimensional object and cannot be seen from an upper viewpoint. In the present example, the hidden surface removal processing is performed using the Z buffer 1306 which is a local memory that stores height information for each pixel. As a result, in a case where there is a region overlapping in the height direction between adjacent three-dimensional objects, the hidden surface removal unit 1305 removes the overlapping region of the lower three-dimensional object hidden by the higher three-dimensional object, and further reduces the data amount.

Figure 14:
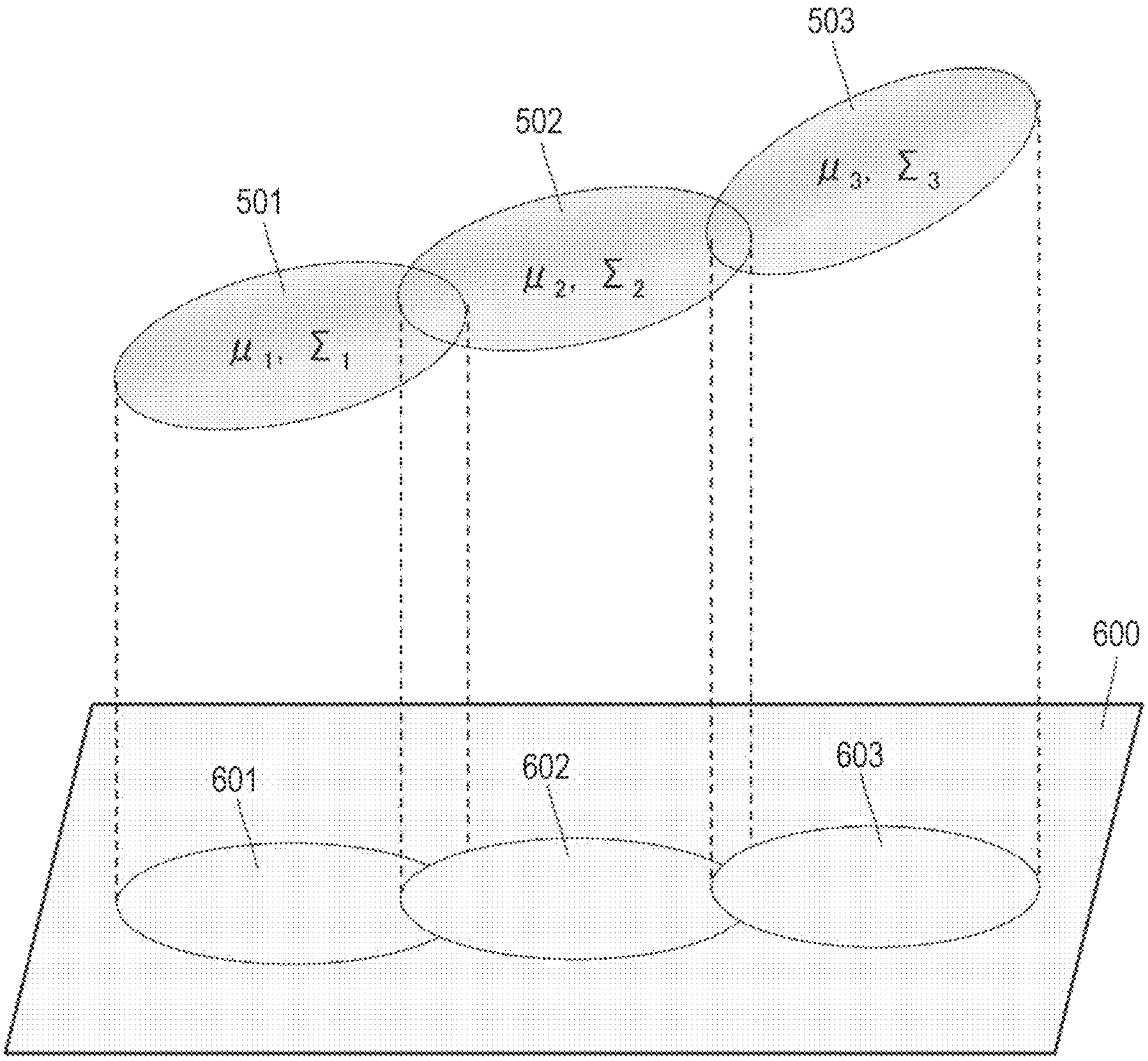
FIG. 14 is a diagram illustrating a state in which the plurality of three-dimensional objects illustrated in FIG. 5 is orthogonally projected onto a reference plane (a case where a hidden surface removal processing is performed).

FIG. 6 illustrates an example of projection of the three-dimensional object onto the reference plane in a case where the hidden surface removal processing is not performed. In the example illustrated in FIG. 6, overlapping regions are generated between the adjacent ellipsoid flat plates 601 and 602 and between the adjacent ellipsoid flat plates 602 and 603. On the other hand, FIG. 14 illustrates a projection example of the three-dimensional object onto the reference plane in the case of performing the hidden surface removal processing according to the present example. In this case, in the overlapping region between the adjacent ellipsoid flat plates 601 and 602, the higher ellipsoid flat plate 602 is rendered. Furthermore, in the overlapping region between the adjacent ellipsoid flat plates 602 and 603, the higher ellipsoid flat plate 603 is rendered.

In the first example, the Z buffer 1306 stores height information of the three-dimensional object orthogonally projected up to the previous time as a Z value for each pixel (alternatively, a region serving as a processing unit) of the reference plane. Then, when the projection unit 1304 orthogonally projects another three-dimensional object to the same pixel next time, the magnitude of the value of the height stored in the Z buffer 1306 up to the previous time and the value of the height of the three-dimensional object orthogonally projected this time are compared (that is, the Z test). At this time, if the current height is higher, orthogonal projection processing of the current three-dimensional object onto the reference plane is performed, and the height information of the pixel in the Z buffer 1306 is updated. On the other hand, if the current height is lower, it is hidden under the already orthogonally projected two-dimensional object and cannot be seen, so that it is not necessary to newly perform orthogonally projection processing on the reference plane. If orthogonal projection is performed from a three-dimensional object existing at a high position and orthogonal projection is performed on a three-dimensional object existing at a low position last, calculation time can be saved. Therefore, according to the first example, by using the Z buffer 1306, the hidden surface removal unit 1305 can efficiently perform the hidden surface removal processing of the low-dimensional object after projection by the projection unit 1304.

The negative elimination method is well known in the field of 3DCG. However, in the field of 3DCG, other methods such as a scan line method and a ray tracing method are known in addition to a method of using a Z buffer as hidden surface removal processing. In the present embodiment, the hidden surface removal method using the Z buffer is adopted from the viewpoint of memory access and calculation amount.

C-2. Second Example

Also in a second example, similarly to the first example, when the projection unit 1304 orthogonally projects a plurality of three-dimensional objects onto the reference plane to make the plurality of three-dimensional objects two-dimensional, the hidden surface removal processing is performed using the Z buffer. Similarly to the first example, the second example is also realized by using the information processing apparatus 1300 having the functional configuration illustrated in FIG. 13.

In the first example, the Z buffer 1306 stores the height information itself for each pixel. On the other hand, in the second example, the Z buffer 1306 indexes the height information, and the Z buffer 1306 stores the index of the height information. Therefore, according to the second example, the capacity of the Z buffer 1306 can be reduced.

In the second example, in a case where the projection unit 1304 orthogonally projects another three-dimensional object to the same pixel next time, height information is acquired on the basis of the index previously stored in the Z buffer 1306, and a Z test with the height information of the three-dimensional object orthogonally projected this time is performed. The hidden surface removal processing according to the result of the Z test is similar to that of the first example.

C-3. Third Example

Also in a third example, similarly to the first and second examples, when the projection unit 1304 orthogonally projects a plurality of three-dimensional objects onto the reference plane to make the plurality of three-dimensional objects two-dimensional, the hidden surface removal processing is performed using the Z buffer. Similarly to the first example, the third example is also realized by using the information processing apparatus 1300 having the functional configuration illustrated in FIG. 13. However, in the third example, the Z buffer 1306 may store either the height information of the three-dimensional object or the index of the height information.

Figure 15:
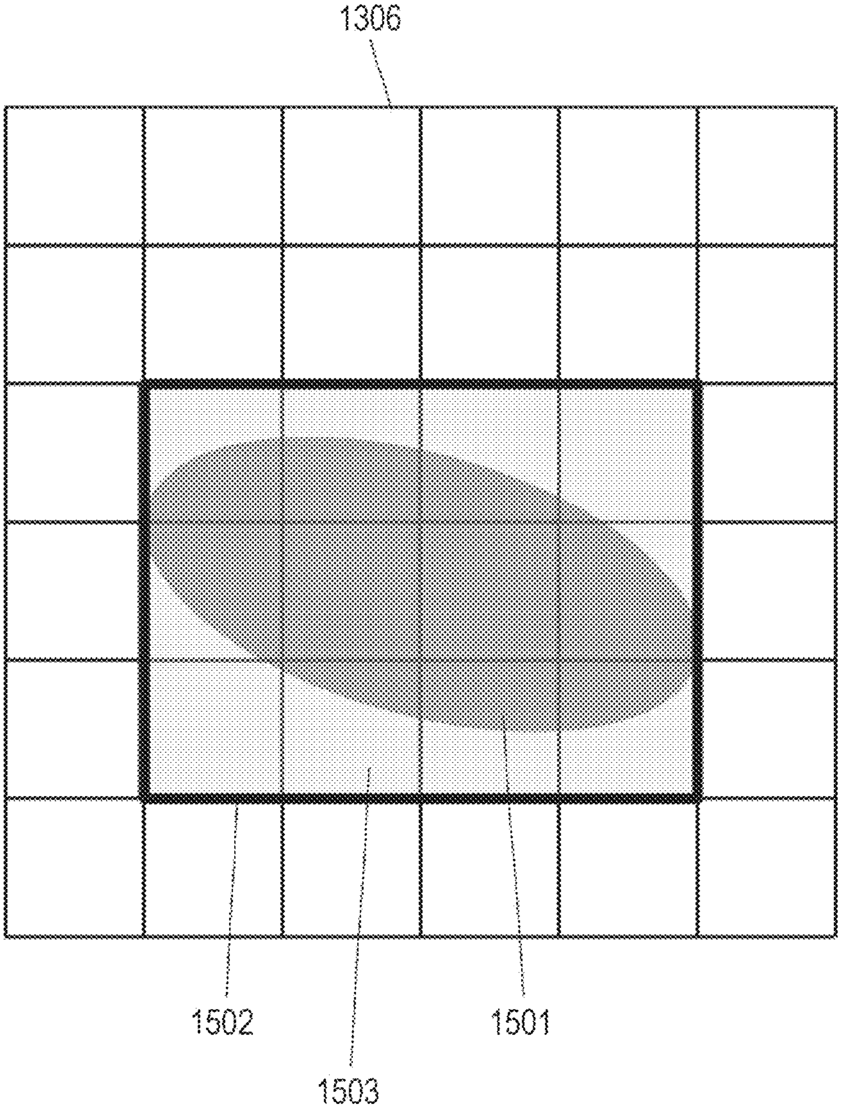
FIG. 15 is a diagram illustrating a processing region in a Z buffer limited by a bounding box obtained for an object.

In the third example, a bounding box is obtained in advance for each three-dimensional object before orthographic projection by the projection unit 1304. The bounding box is a square box (rectangle) of the size required to just enclose the object. Then, in a case where the projection unit 1304 orthogonally projects a certain three-dimensional object, the hidden surface removal unit 1305 limits a region to be processed on the Z buffer 1306 on the basis of a bounding box obtained in advance for the three-dimensional object. FIG. 15 illustrates a processing region 1503 limited on the basis of the bounding box 1502 obtained for the object 1501 to be processed in the memory region of the Z buffer 1306. Therefore, according to the third example, the memory access amount to the Z buffer 1306 can be reduced.

C-4. Fourth Example

Also in a fourth example, similarly to the first to third examples, when the projection unit 1304 orthogonally projects a plurality of three-dimensional objects onto the reference plane to make the plurality of three-dimensional objects two-dimensional, the hidden surface removal processing is performed using the Z buffer. Similarly to the first example, the fourth example is also realized by using the information processing apparatus 1300 having the functional configuration illustrated in FIG. 13. However, in the fourth example, the Z buffer 1306 may store either the height information of the three-dimensional object or the index of the height information.

Figure 16:
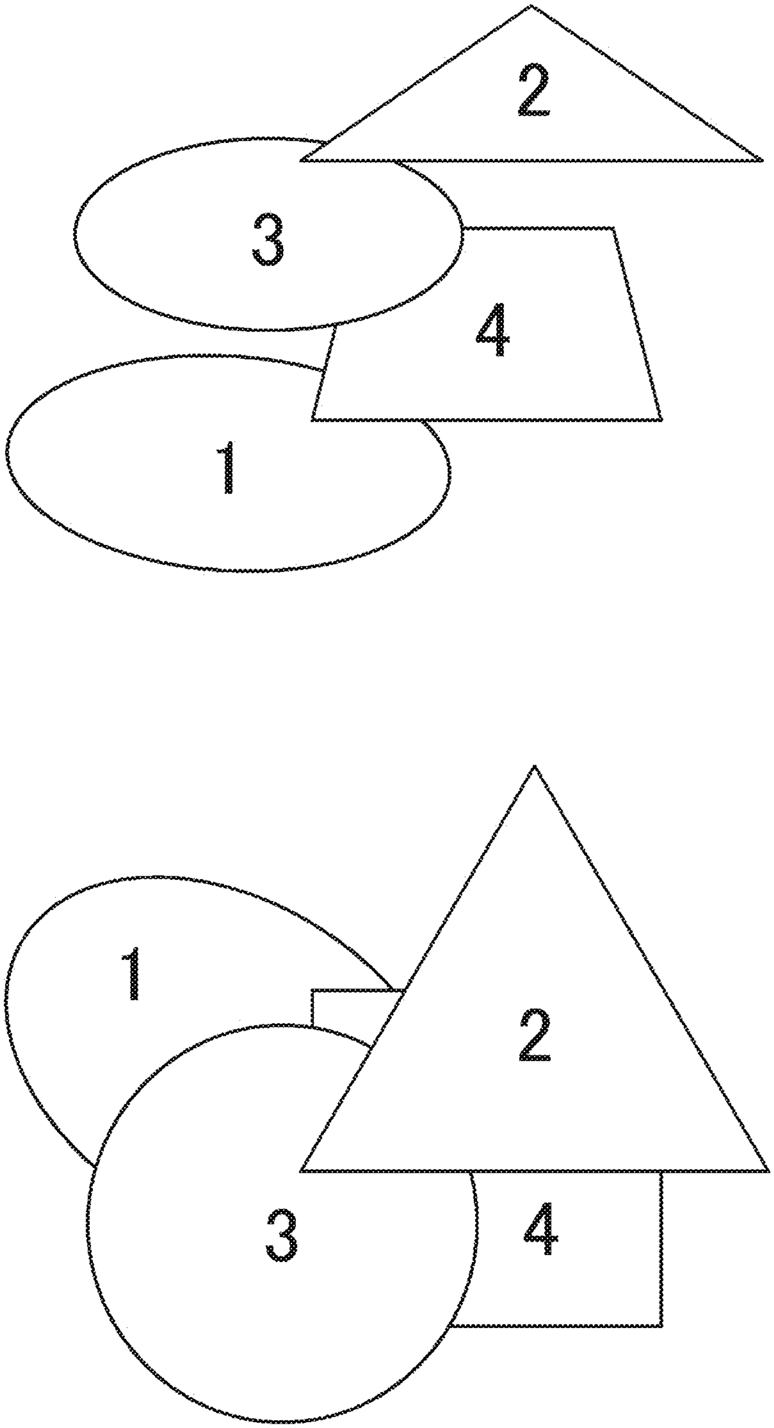
FIG. 16 is a diagram illustrating a result of sorting a plurality of objects in order of construction.
Figure 17:
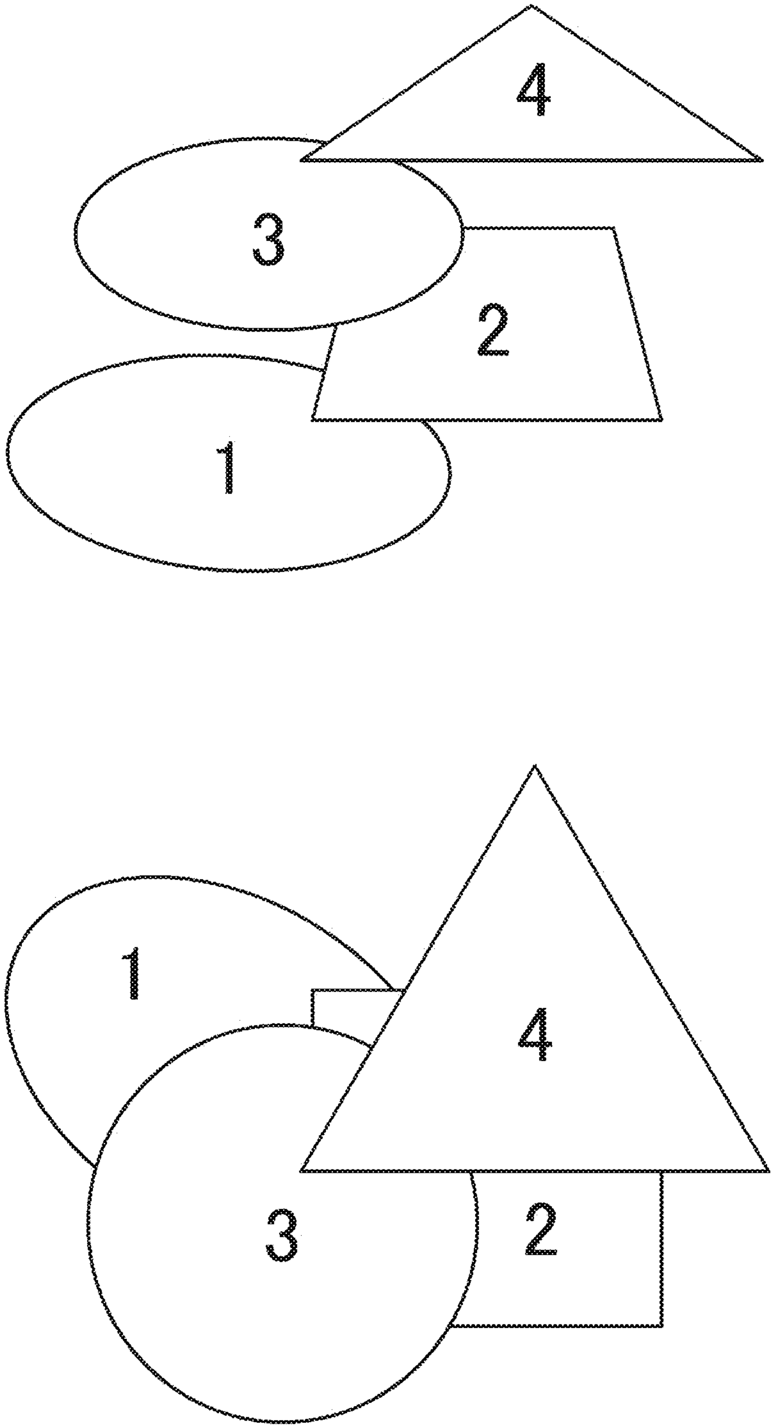
FIG. 17 is a diagram illustrating a result of sorting a plurality of objects in a height direction.

In the fourth example, the projection unit 1304 sorts the three-dimensional objects orthogonally projected onto the reference plane in the height direction, and then the hidden surface removal unit 1305 performs the hidden surface removal processing. FIG. 16 illustrates a result of sorting the four objects, for example, in the order of construction. However, FIG. 16 illustrates a state in which each object arranged in a three-dimensional space is viewed in a perspective manner, and FIG. 16 illustrates a state in which each object is viewed from above. In the drawing, each object is assigned with an order sorted in the order of construction. Then, FIG. 17 illustrates a result of sorting the four objects illustrated in FIG. 16 in the height direction. In the drawing, each object is given an order sorted in the height direction.

In a case where the hidden surface removal unit 1305 performs hidden surface removal processing of the three-dimensional object using the Z buffer 1306, if the height of the three-dimensional object at this time is lower, the three-dimensional object is hidden under the already orthographically-projected two-dimensional object and cannot be seen, so that it is not necessary to newly perform orthographically-projected processing on the reference plane. Therefore, according to the fourth example, the hidden surface removal unit 1305 performs the hidden surface removal processing in the order sorted in the height direction, so that the height of the three-dimensional object at this time is a lower result in the Z test. Therefore, the calculation processing in the Z buffer 1306 can be simplified, and the calculation time can be saved.

C-5. Fifth Example

Also in a fifth example, similarly to the first to fourth examples, when the projection unit 1304 orthogonally projects a plurality of three-dimensional objects onto the reference plane to make the plurality of three-dimensional objects two-dimensional, the hidden surface removal processing is performed using the Z buffer. Similarly to the first example, the fifth example is also realized by using the information processing apparatus 1300 having the functional configuration illustrated in FIG. 13. However, in the fifth example, it is assumed that the Z buffer 1306 stores the height information of the three-dimensional object. Furthermore, also in the fifth example, similarly to the fourth example, the hidden surface removal processing may be performed after the three-dimensional objects are sorted in the height direction.

Figure 18:
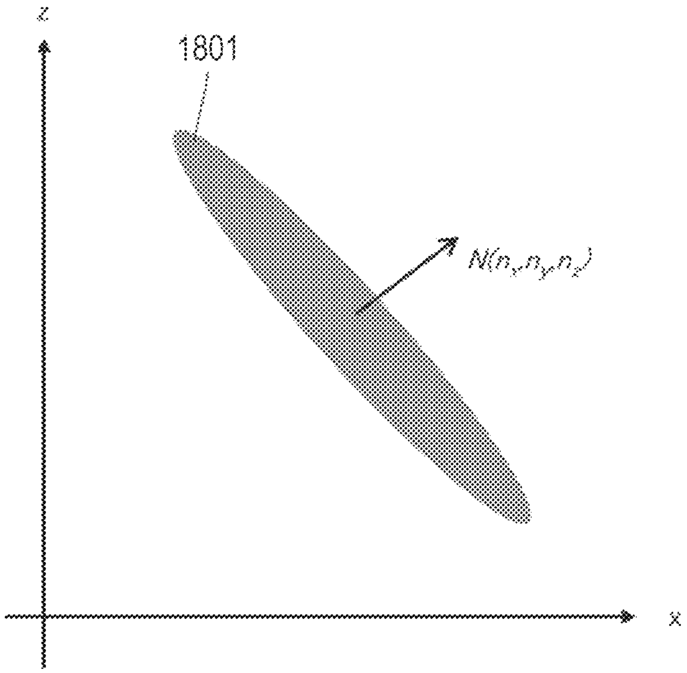
FIG. 18 is a diagram for explaining height calculation using an incremental method.

In the fifth example, the hidden surface removal unit 1305 uses an incremental method for calculating the height of the Z buffer 1306. That is, in the Z test for comparing the height value stored in the Z buffer 1306 up to the previous time with the height value of the three-dimensional object orthogonally projected this time, the height of the three-dimensional object orthogonally projected this time is not calculated independently for each pixel, but the height increment is added to the Z value. For example, assuming that the normal vector of the three-dimensional object 1801 illustrated in FIG. 18 is N ($n_x$, $n_y$, $n_z$), the height is obtained by adding the height increment z=−/to the Z value every time the pixel position is shifted.

Therefore, according to the fifth example, by performing the height calculation using the incremental method, the calculation processing in the Z buffer 1306 can be simplified, and the calculation time can be saved.

C-6. Sixth Example

Also in a sixth example, similarly to the first to fifth examples, when the projection unit 1304 orthogonally projects a plurality of three-dimensional objects onto the reference plane to make the plurality of three-dimensional objects two-dimensional, the hidden surface removal processing is performed using the Z buffer. Similarly to the first example, the sixth example is also realized by using the information processing apparatus 1300 having the functional configuration illustrated in FIG. 13.

Figure 19:
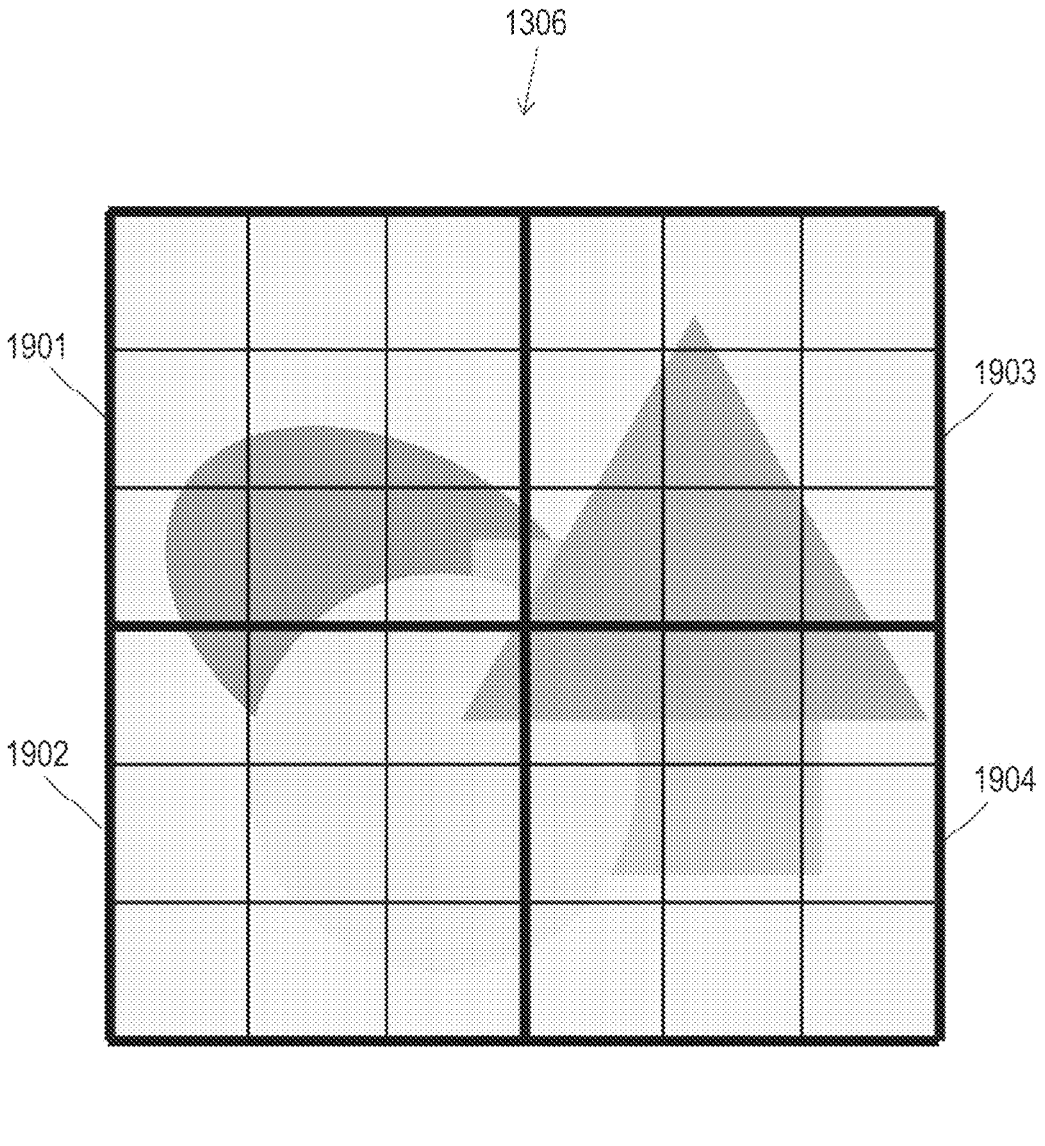
FIG. 19 is a diagram illustrating a state in which the Z buffer is divided into a plurality of tiles.
Figure 20:
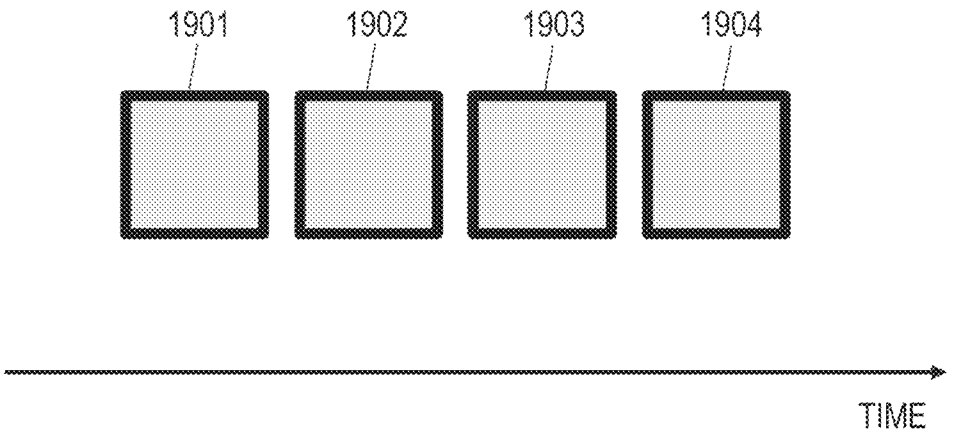
FIG. 20 is a diagram illustrating a state in which height calculation for each tile is sequentially executed.

In the sixth example, the Z buffer 1306 is divided into a plurality of tiles, and the hidden surface removal unit 1305 performs height calculation (Z test) for comparing the magnitude of the height value stored in the Z buffer 1306 up to the previous time with the magnitude of the height value of the three-dimensional object orthogonally projected this time on the same memory for each tile. FIG. 19 illustrates a state in which the Z buffer 1306 is divided into four tiles 1901 to 1904. However, the method of dividing the Z buffer 1306 into tiles and the number of tiles to be divided are not limited to the example illustrated in FIG. 19. FIG. 20 illustrates a state in which the height calculation of each tile 1901 to 1904 is sequentially executed using one memory. However, the order of tiles for which the height calculation is executed is not limited to the example illustrated in FIG. 20. According to the sixth example, since the height calculation is performed using a memory having a smaller capacity, memory resources can be reduced.

C-7. Seventh Example

Also in a seventh example, similarly to the first to sixth examples, when the projection unit 1304 orthogonally projects a plurality of three-dimensional objects onto the reference plane to make the plurality of three-dimensional objects two-dimensional, the hidden surface removal processing is performed using the Z buffer. Similarly to the first example, the seventh example is also realized by using the information processing apparatus 1300 having the functional configuration illustrated in FIG. 13.

Figure 21:
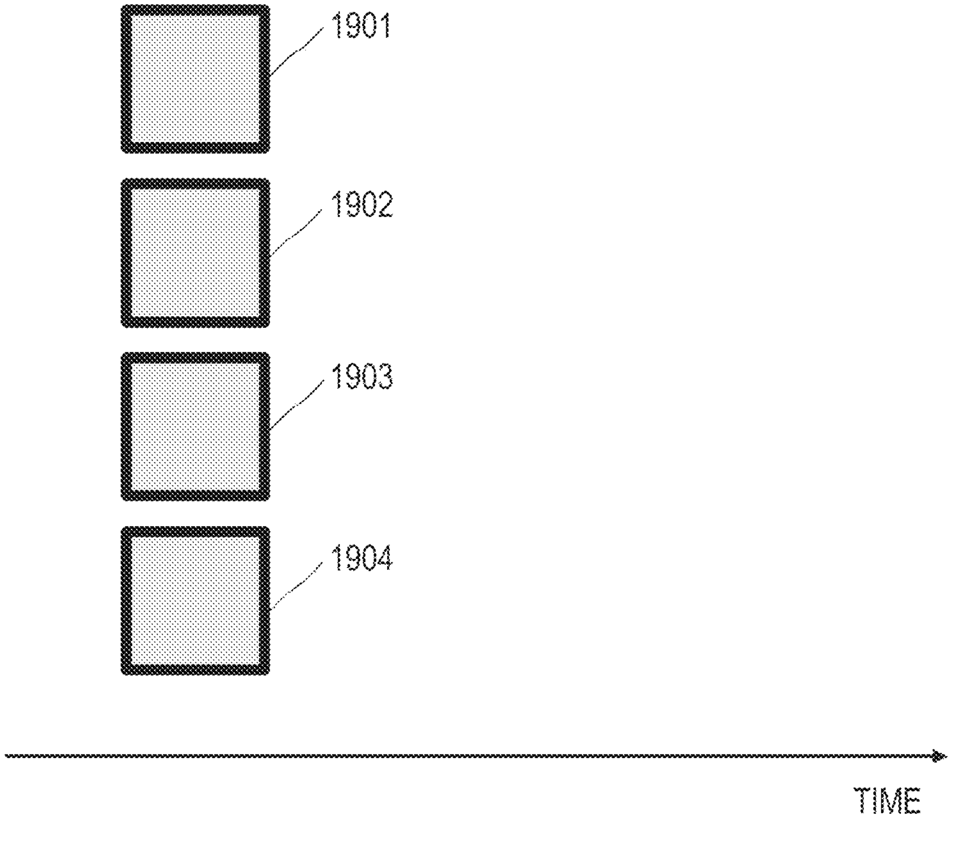
FIG. 21 is a diagram illustrating a state in which height calculations of a plurality of tiles are simultaneously executed.

In the seventh example, similarly to the sixth example, the Z buffer 1306 is divided into a plurality of tiles, but the hidden surface removal unit 1305 simultaneously performs height calculations of a plurality of tiles. FIG. 21 illustrates a state in which the height calculation of each tile 1901 to 1904 (see FIG. 19) is simultaneously executed. According to the seventh example, the memory resources for simultaneously executing the height calculation are required, but the calculation time can be reduced. For example, height calculations of a plurality of tiles may be simultaneously executed using a multi-core CPU or GPU.

C-8. Eighth Example

Figure 22:
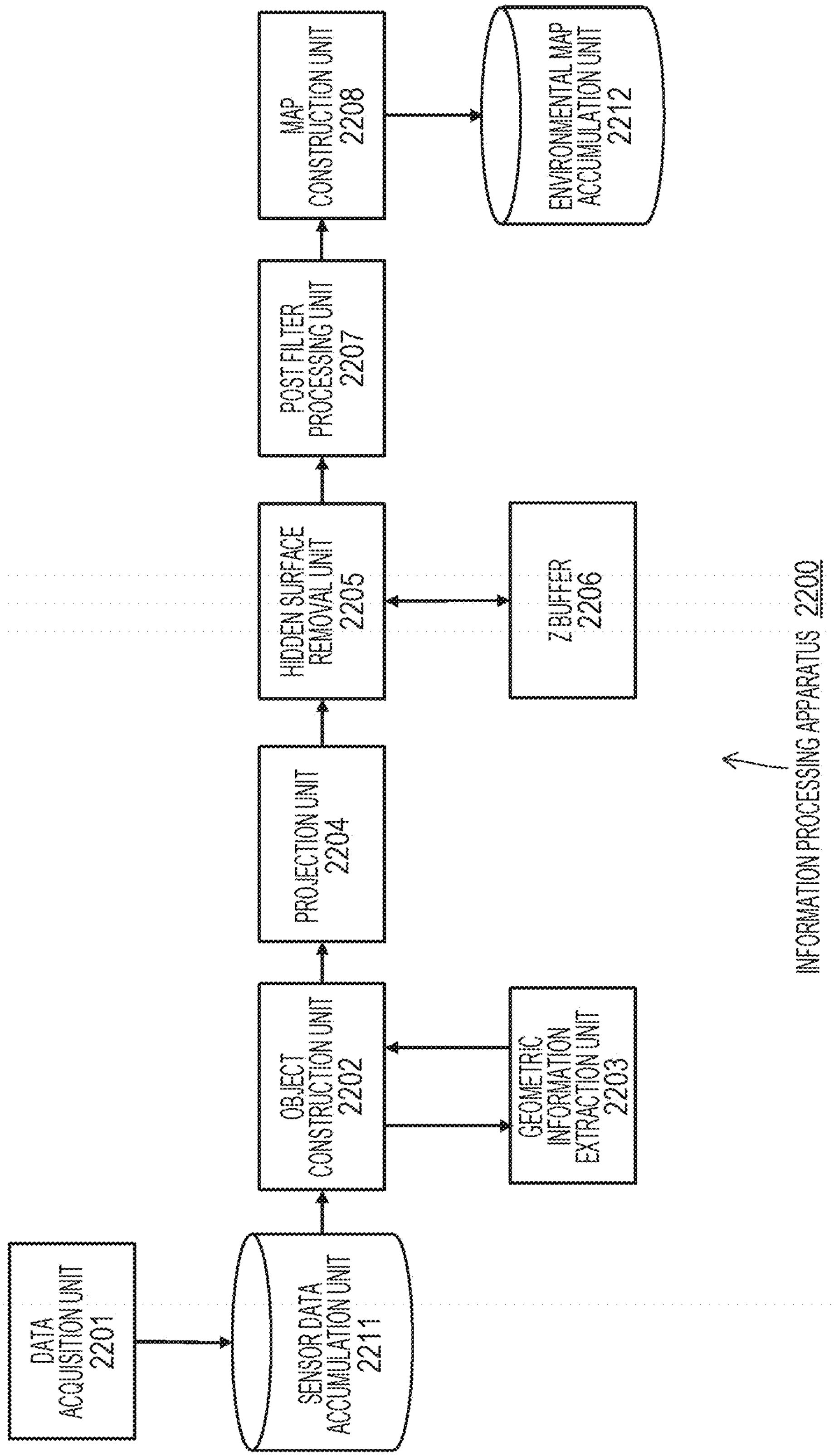
FIG. 22 is a diagram illustrating a functional configuration of an information processing apparatus 2200 according to an eighth example.

FIG. 22 illustrates a functional configuration of an information processing apparatus 2200 according to an eighth example. The illustrated information processing apparatus 2200 includes functional modules of a data acquisition unit 2201, an object construction unit 2202, a geometric information extraction unit 2203, a projection unit 2204, a hidden surface removal unit 2205 and a Z buffer 2206, a post filter processing unit 2207, and a map construction unit 2208. However, the data acquisition unit 2201, the object construction unit 2202, the geometric information extraction unit 2203, the projection unit 2204, the hidden surface removal unit 2205, the Z buffer 2206, and the map construction unit 2208 are the same as the functional modules having the same names of the information processing apparatus 100 illustrated in FIG. 1 or the information processing apparatus 1300 illustrated in FIG. 13, and thus detailed description thereof is omitted here.

After performing the hidden surface removal processing of the low-dimensional object by the hidden surface removal unit 2205, the post filter processing unit 2207 performs filter processing such as filling processing of gaps generated between adjacent low-dimensional objects and smoothing processing of discontinuous data (height, expected value, variance, etc.) between adjacent low-dimensional objects.

Figure 23:
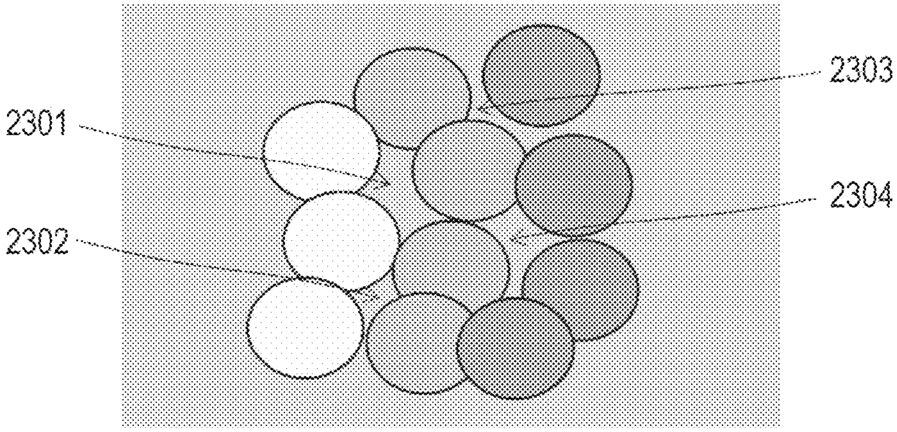
FIG. 23 is a diagram illustrating a state of a reference plane immediately after hidden surface removal processing for a low-dimensional object is performed.

FIG. 23 illustrates the state of the reference plane immediately after the hidden surface removal unit 2205 performs the hidden surface removal processing on the low-dimensional object. A plurality of low-dimensional objects is arranged on the reference plane. Each low-dimensional object is made of an ellipsoid flat plate or the like. An overlapping region between adjacent low-dimensional objects is correctly subjected to the hidden surface removal processing. On the other hand, between the low-dimensional objects, there are not any low-dimensional objects (In other words, there is no data), and there are one or more gaps or “holes”. In the example illustrated in FIG. 23, “holes” are generated at four locations indicated by reference numerals 2301 to 2304. The “holes” scattered on the reference plane are generated due to the clustering of the high-dimensional point cloud and the data amount reduction by the object construction, and may not exist in the object to be sensed. If such a region of the gap is left as it is, the region becomes a discontinuous region in the map constructed by the subsequent map construction unit 2208.

Figure 24:
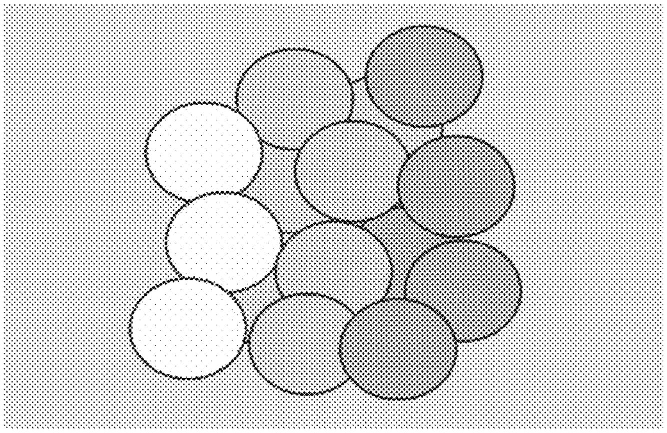
FIG. 24 is a diagram illustrating a result of performing filling processing on the reference plane immediately after the hidden surface removal processing illustrated in FIG. 23.

FIG. 24 illustrates a result of performing the filling processing by the post filter processing unit 2207 on the reference plane immediately after the hidden surface removal processing illustrated in FIG. 23. The post filter processing unit 2207 performs filling processing using objects around the gap area. For example, the post filter processing unit 2207 performs filling processing using a higher object among objects around the gap, or performs filling processing using an object obtained by averaging a plurality of surrounding objects. Therefore, according to the eighth example, by performing the filling processing as described above, it is possible to improve the accuracy of the map by performing smoothing so as not to generate a discontinuous region in the map constructed by the subsequent map construction unit 2208.

C-9. Ninth Example

Figure 25:
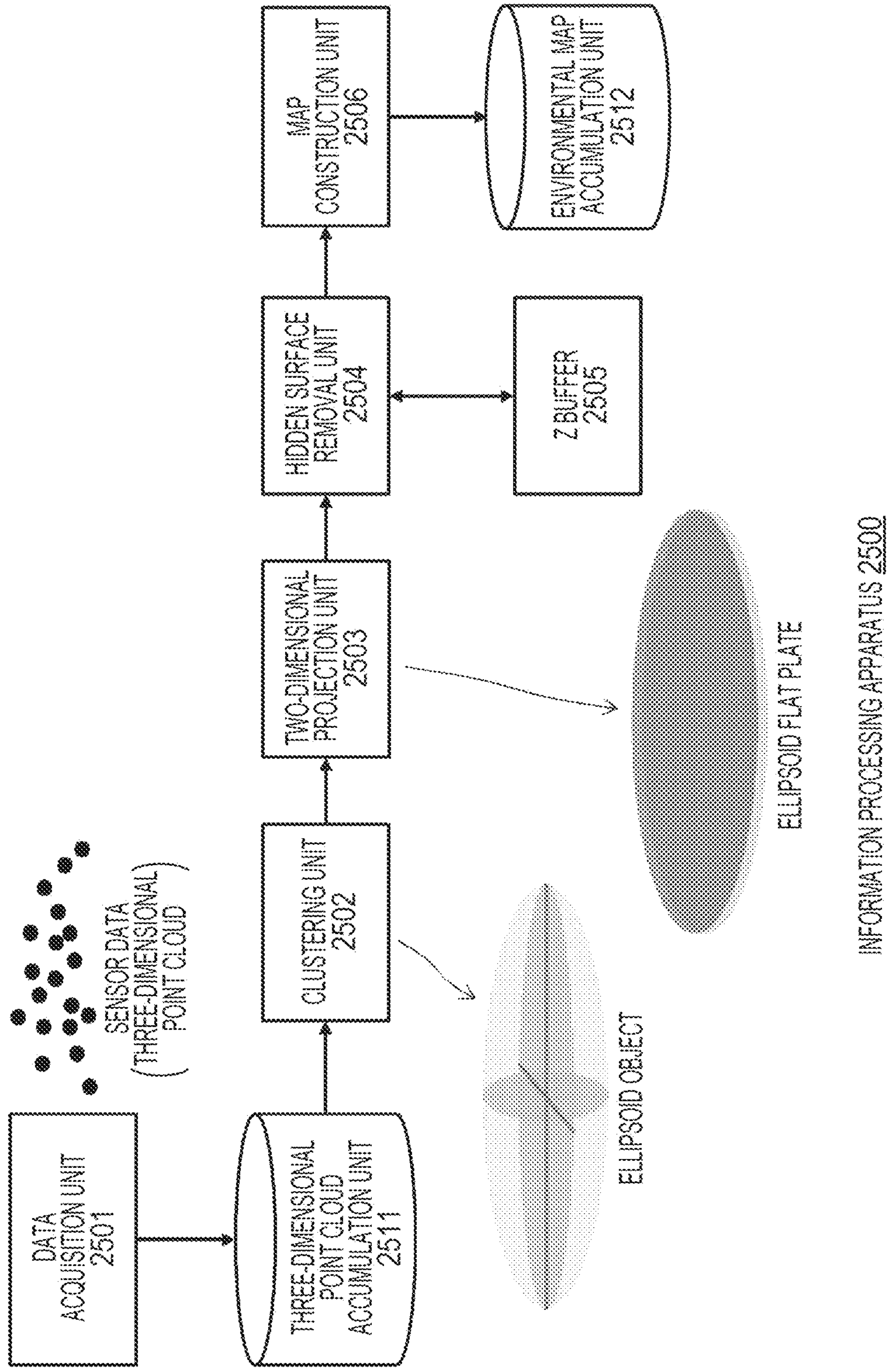
FIG. 25 is a diagram illustrating a functional configuration of an information processing apparatus 2500 according to a ninth example.

FIG. 25 illustrates a functional configuration of an information processing apparatus 2500 according to a ninth example. The illustrated information processing apparatus 2500 includes functional modules of a data acquisition unit 2501, a clustering unit 2502, a two-dimensional projection unit 2503, a hidden surface removal unit 2504, a Z buffer 2505, and a map construction unit 2506. However, since the hidden surface removal unit 2504, the Z buffer 2505, and the map construction unit 2506 are the same as the functional modules having the same names of the information processing apparatus 1300 illustrated in FIG. 13, detailed description thereof is omitted here.

The data acquisition unit 2501 acquires sensor data including a three-dimensional point cloud from a sensor mounted on, for example, a small robot, such as a depth camera, a LiDAR, a distance measurement sensor, or a stereo camera. The three-dimensional point cloud data acquired by the data acquisition unit 2501 is temporarily stored in a sensor data accumulation unit 2511.

The clustering unit 2502 clusters a large number of three-dimensional point clouds accumulated in the three-dimensional point cloud accumulation unit 2511. The clustering unit 2502 performs the clustering of the three-dimensional point clouds with a low processing load and a short processing time using, for example, the technology disclosed in Patent Document 2. Furthermore, when the clustering unit 2502 performs principal component analysis on the three-dimensional point cloud included in each cluster to obtain the average p and the covariance Z, the clustering unit further performs eigenvalue decomposition on the covariance Z to generate an ellipsoid object having the average p as the center, the eigenvector as the inclination of the ellipsoid, and each eigenvalue as the length of the major axis and the minor axis of the ellipse.

Therefore, according to the ninth example, it is possible to suitably construct the low-dimensional environmental map by performing the data acquisition unit 2501 in the case of acquiring the sensor data including the three-dimensional point cloud from the depth camera, the LiDAR, the distance measurement sensor, the stereo camera, or the like.

C-10. Tenth Example

Similarly to the ninth example, a tenth example is realized by using the information processing apparatus 2500 having the functional configuration illustrated in FIG. 25.

The two-dimensional projection unit 2503 orthogonally projects each cluster output from the clustering unit 2502 onto a reference plane parallel to the ground to generate a two-dimensional object including an ellipsoid flat plate. In the following processing, each cluster is treated as an ellipsoid flat plate. Therefore, according to the tenth example, it is possible to obtain an environmental map with necessary and sufficient accuracy while simplifying subsequent processing such as hidden surface removal and map construction.

C-11. Eleventh Example

Figure 26:
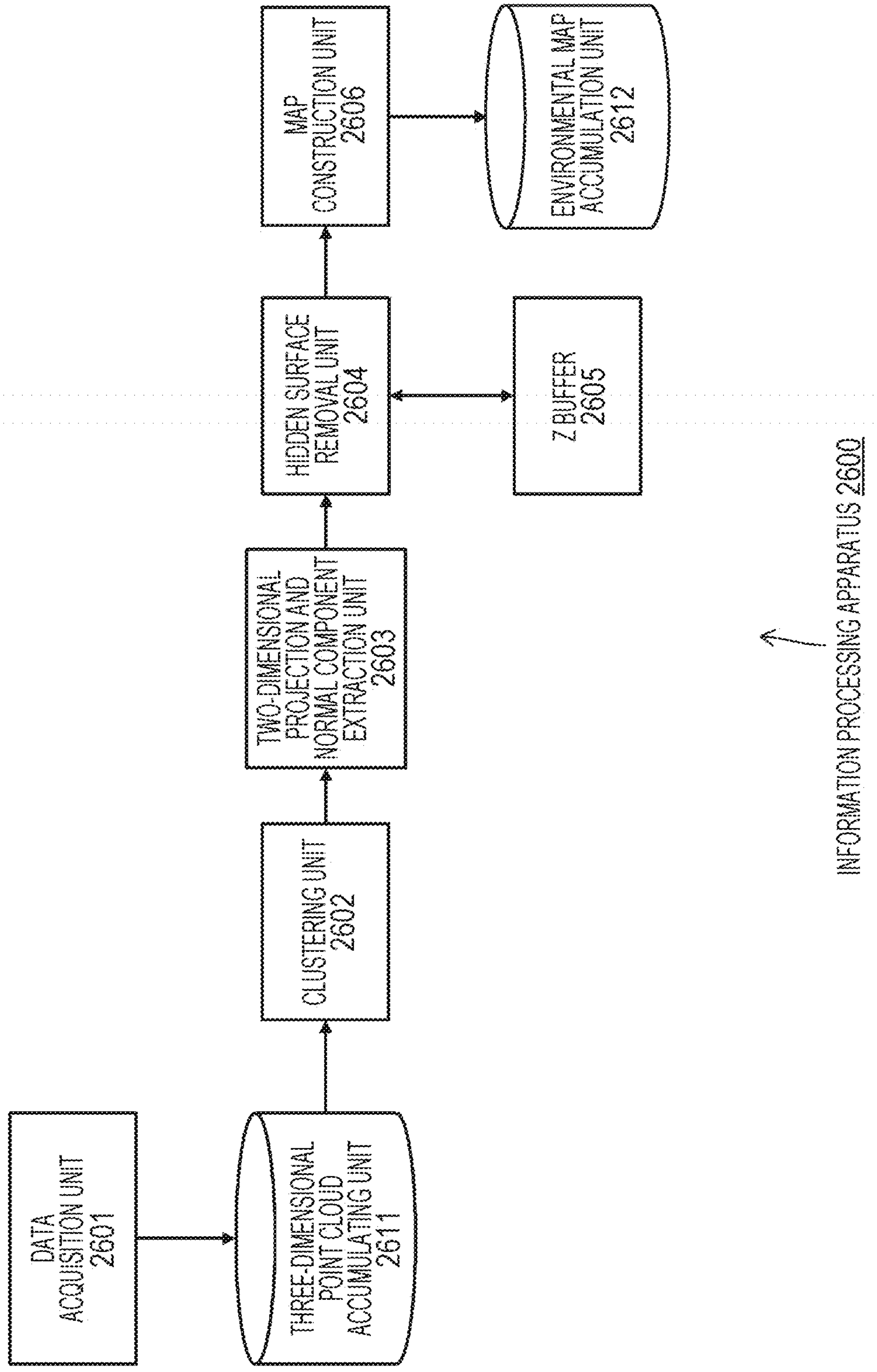
FIG. 26 is a diagram illustrating a functional configuration of an information processing apparatus 2600 according to an eleventh example.

FIG. 26 illustrates a functional configuration of an information processing apparatus 2600 according to an eleventh example. The illustrated information processing apparatus 2600 includes functional modules of a data acquisition unit 2601, a clustering unit 2602, a two-dimensional projection and normal component extraction unit 2603, a hidden surface removal unit 2604 and a Z buffer 2605, and a map construction unit 2606. However, the data acquisition unit 2601, the clustering unit 2602, the hidden surface removal unit 2604, and the Z buffer 2605 are the same as the functional modules having the same names of the information processing apparatus 2500 illustrated in FIG. 25, and thus, detailed description thereof is omitted here.

The two-dimensional projection and normal component extraction unit 2603 orthogonally projects each cluster output from the clustering unit 2502 onto a reference plane parallel to the ground to generate a two-dimensional object including an ellipsoid flat plate. At that time, the two-dimensional projection and normal component extraction unit 2603 extracts a normal component of each ellipsoid object as information indicating uncertainty of each original three-dimensional point cloud. Then, the map construction unit 2606 constructs a map to which information indicating uncertainty is assigned to each two-dimensional object after the hidden surface removal processing by the hidden surface removal unit 2603.

Figure 27A:
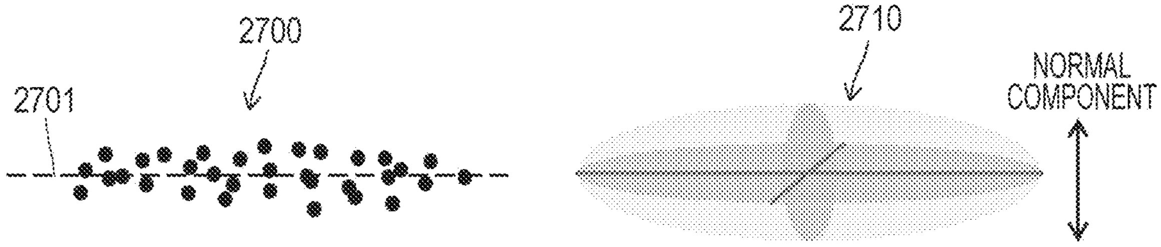
FIGS. 27A and 27B are diagrams illustrating a relationship between a three-dimensional point cloud and an ellipsoid object constructed from the three-dimensional point cloud.
Figure 27B:
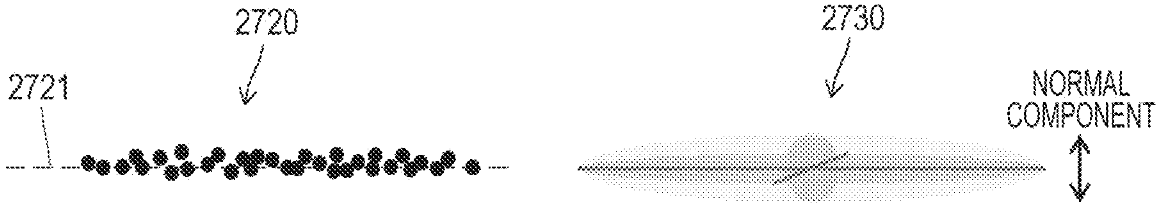

FIGS. 27A and 27B illustrate a relationship between a three-dimensional point cloud and an ellipsoid object constructed from the three-dimensional point cloud. FIG. 27A illustrates a three-dimensional point cloud 2700 and an ellipsoid object 2710 constructed from the three-dimensional point cloud 2700. The three-dimensional point cloud 2700 has a large variance from the average $\mu 1$ indicated by the reference number 2701. For example, the variance of the three-dimensional point cloud output from the depth camera that captures an uncertain road surface such as a road surface with severe unevenness of the surface or a road surface on which a carpet is laid increases. Therefore, the normal component of the ellipsoid object 2710 constructed from the three-dimensional point cloud 2700 increases. On the other hand, FIG. 27B illustrates a three-dimensional point cloud 2720 and an ellipsoid object 2730 constructed from the three-dimensional point cloud 2720. The three-dimensional point cloud 2720 has a small variance from the average $\mu 2$ indicated by the reference number 2721. For example, the variance of the three-dimensional point cloud output from the depth camera that captures a certain road surface such as a flat road surface becomes small.

As can be seen from FIGS. 27A and 27B, since the normal component of the ellipsoid object increases according to the variance of the three-dimensional point cloud, it can be said that the normal component of the ellipsoid object represents the uncertainty of the original three-dimensional point cloud.

The map construction unit 2606 gives information indicating uncertainty to each elliptic flat object after the hidden surface removal processing by the hidden surface removal unit 2603 on the basis of the normal component extracted from the elliptic object before projection. For example, the map construction unit 2606 may color-code and express each ellipsoid flat object after the hidden surface removal processing according to the normal component of each ellipsoid object before projection.

Figure 28A:
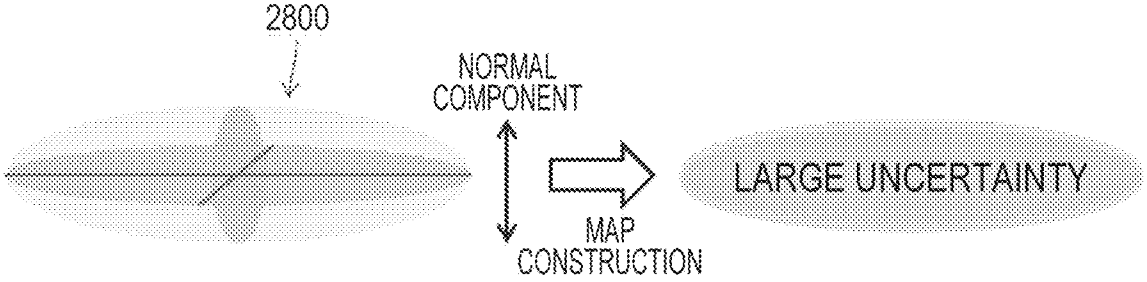
FIGS. 28A and 28B are diagrams illustrating an example in which an ellipsoid flat plate object after projection is color-coded and expressed according to a normal component of the ellipsoid object.
Figure 28B:
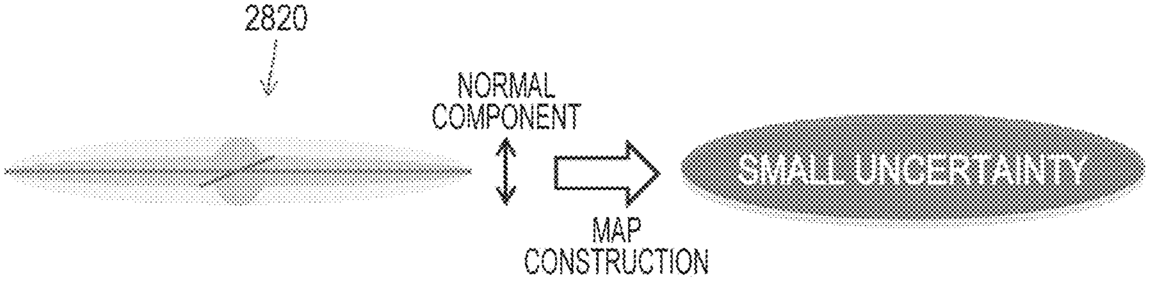

FIGS. 28A and 28B illustrate an example in which the projected ellipsoid flat plate object is color-coded according to the normal component of the ellipsoid object. FIG. 28A illustrates an example in which an ellipsoid flat plate object 2800 on which an ellipsoid flat plate object 2810 having a large normal component is projected is drawn in light color to express that the uncertainty of the region of the ellipsoid flat plate object 2810 is large. Furthermore, FIG. 28B illustrates an example in which the ellipsoid flat plate object 2830 on which the ellipsoid object 2820 having a small normal component is projected is drawn in a dark color to express that the uncertainty of the region of the ellipsoid flat plate object 2830 is small.

According to an eleventh example, a map reflecting uncertainty of sensor data can be obtained. For example, the mobile robot can take a safe action such as selecting a more reliable route by using a map to which information indicating uncertainty is given.

C-12. Twelfth Example

Figure 29:
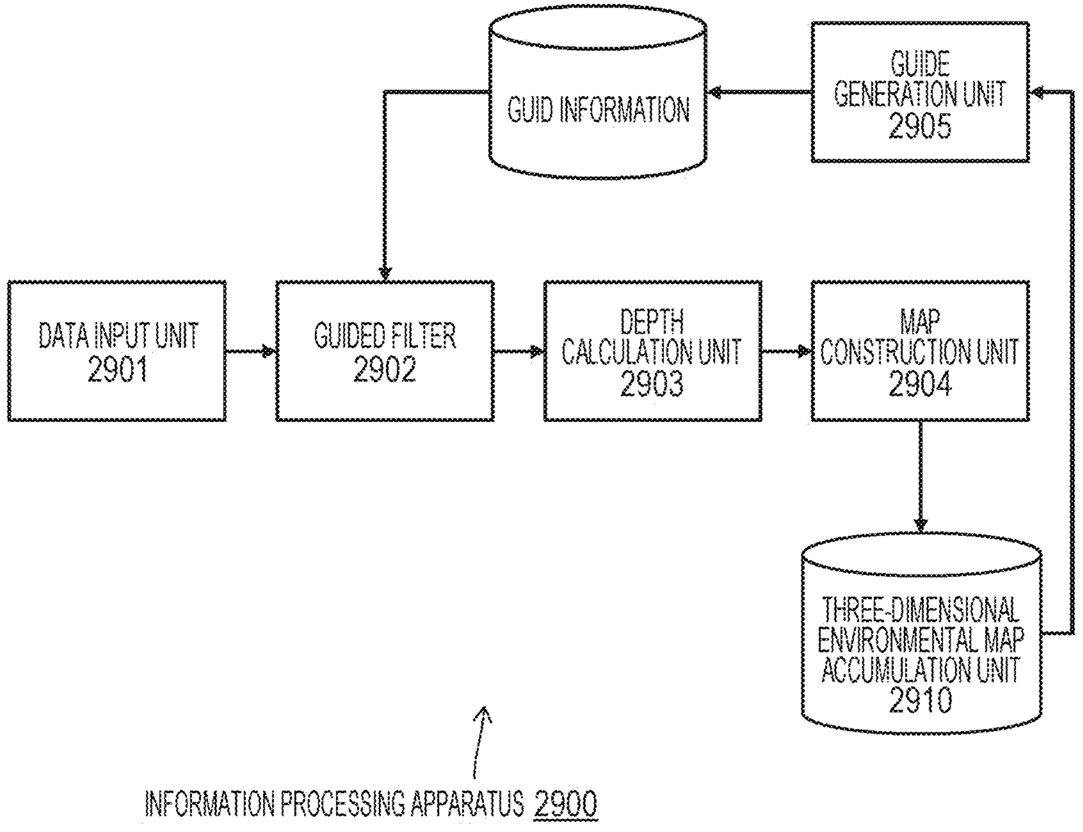
FIG. 29 is a diagram illustrating a functional configuration of an information processing apparatus 2900 according to a twelfth example.

FIG. 29 illustrates a functional configuration of an information processing apparatus 2900 according to a twelfth example. The illustrated information processing apparatus 2900 includes functional modules of a data input unit 2901, a guided filter 2902, a depth calculation unit 2903, an environmental map construction unit 2904, and a guide generation unit 2905, and constructs a three-dimensional environmental map. Each of these functional modules 2901 to 2905 may be, for example, a software module realized by executing a software program on a personal computer (PC), or may be a hardware module realized by a dedicated circuit.

The data input unit 2901 inputs sensor data from one or more sensor elements that recognize an external environment or output recognition data corresponding to the recognized external environment.

The depth calculation unit 2903 inputs sensor data via the guided filter 2902, executes depth calculation, and calculates a three-dimensional position of an object (such as an obstacle) existing in an external environment.

The environmental map construction unit 2904 constructs the three-dimensional environmental map of the current time on the basis of the result of the depth calculation by the depth calculation unit 2903. The environmental map construction unit 2904 stores the constructed three-dimensional environmental map of the current time in the three-dimensional environmental map accumulation unit 2910.

The guide generation unit 2905 generates the guide information on the basis of the three-dimensional environmental map of the previous time as the feedback information in the processing of constructing the three-dimensional environmental map from the sensor data. The guided filter 2902 processes the sensor data input from the data input unit 2901 on the basis of the guide information input from the guide generation unit 2905. The guided filter 2902 removes noise or outliers included in the sensor data input from the data input unit 2901 on the basis of the guide information input from the guide generation unit 2905, for example. The guided filter 2902 may be configured by, for example, a guided filter (see Non-Patent Document 1). The guided filter 2902 may include, for example, a Bayesian filter including a least squares regression (ridge regression) with a regularization term. As a result, the guided filter 2902 can obtain data from which noise or outliers have been removed. The guided filter 2902 outputs the processed data to the depth calculation unit 2903. The environmental map construction unit 2904 constructs the environmental map at the current time using a result of depth calculation from the data processed by the guided filter 2902.

Figure 30:
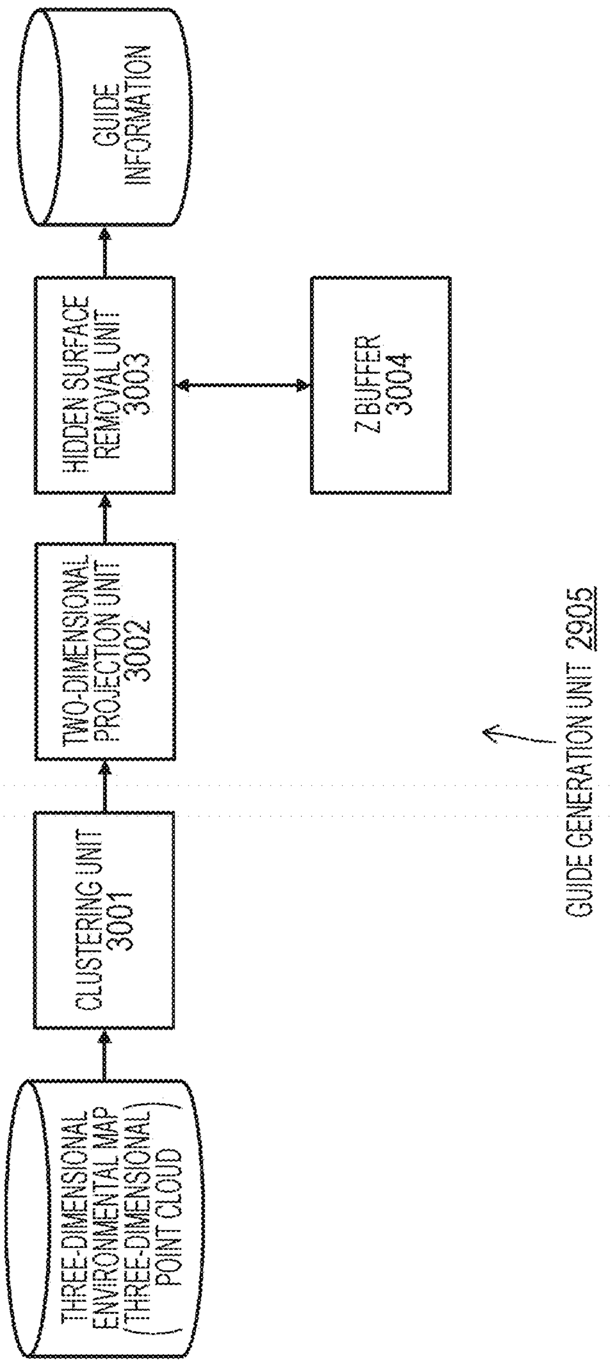
FIG. 30 is a diagram illustrating an internal configuration of a guide generation unit 2905.

FIG. 30 illustrates an internal configuration of the guide generation unit 2905 that generates guide information as feedback information. In the present example, to which the present disclosure is applied, the guide generation unit 2905 includes functional modules of a clustering unit 3001, a two-dimensional projection unit 3002, a hidden surface removal unit 3003, and a Z buffer 3004. However, since each functional module 3001 to 3004 is the same as the functional module having the same name of each of the information processing apparatuses 2500 illustrated in FIG. 25, a detailed description thereof will be omitted here.

A three-dimensional point cloud constituting the three-dimensional environmental map of the previous time is input to the guide generation unit 2905. The clustering unit 3001 clusters the three-dimensional point cloud, and expresses each cluster by a three-dimensional object including an ellipsoid. The two-dimensional projection unit 3002 orthogonally projects each three-dimensional object onto a reference plane to form a two-dimensional object. The hidden surface removal unit 3003 performs a hidden surface removal process between the two-dimensional objects using the Z buffer 3004. Then, the guide generation unit 2905 outputs, as the feedback information, the guide information including the reference plane on which each two-dimensional object after the hidden surface removal processing is arranged.

According to the twelfth example, in the information processing apparatus 2900 that constructs the three-dimensional environmental map from the sensor data using the guided filter 2902, the guide information as the feedback information is generated on the basis of the present disclosure, whereby the feedback processing can be efficiently performed with lower calculation.

C-13. Thirteenth Example

Figure 31:
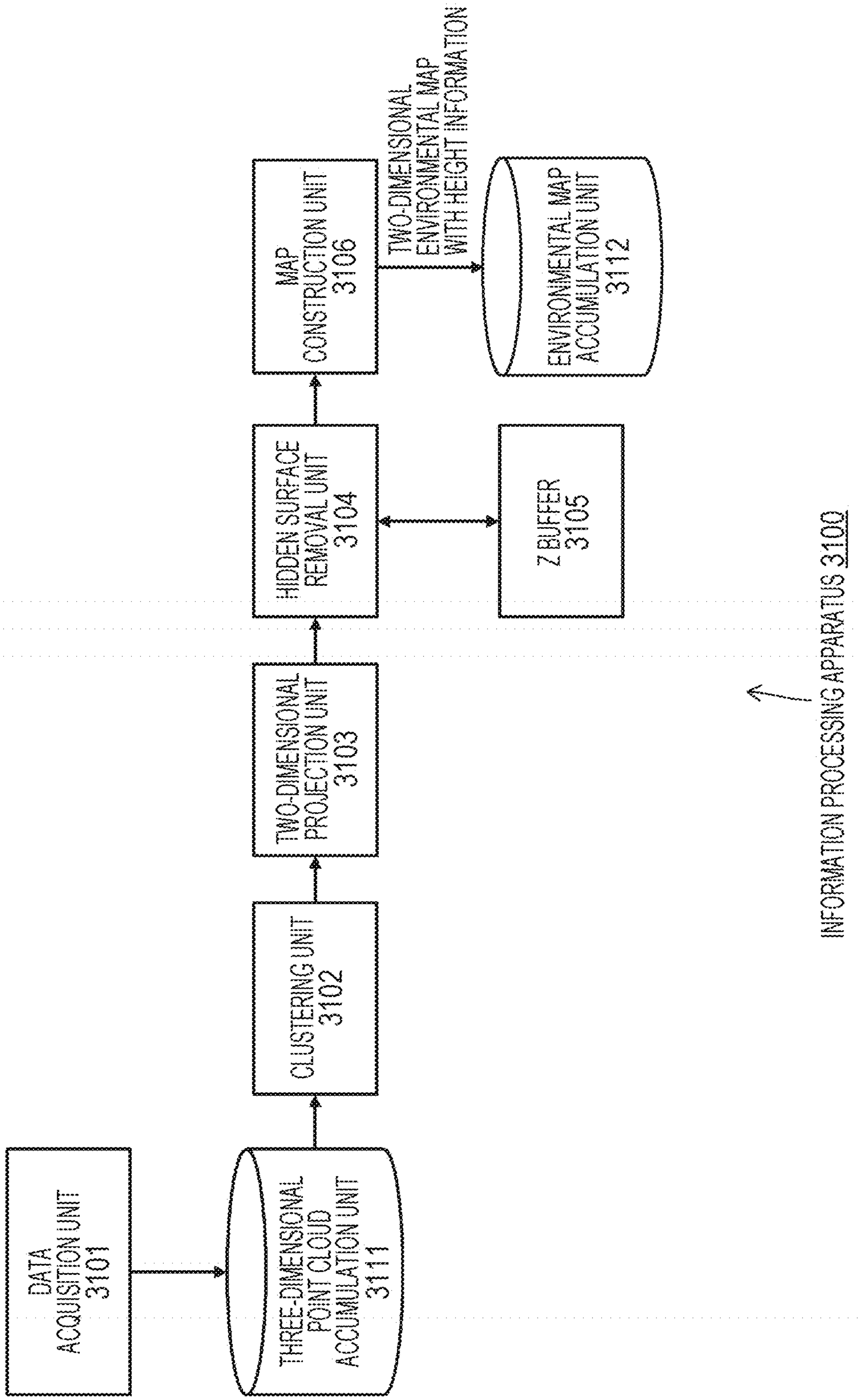
FIG. 31 is a diagram illustrating a functional configuration of an information processing apparatus 3100 according to a thirteenth example.

FIG. 31 illustrates a functional configuration of an information processing apparatus 3100 according to a thirteenth example. The illustrated information processing apparatus 3100 includes functional modules of a data acquisition unit 3101, a clustering unit 3102, a two-dimensional projection unit 3103, a hidden surface removal unit 3104, a Z buffer 3105, and a map construction unit 3106, and is configured to construct a two-dimensional environmental map (HeightMap) including height information. However, the description of the same points as the functional modules having the same names of the information processing apparatus 2500 illustrated in FIG. 25 will be simplified as appropriate below.

The data acquisition unit 3101 acquires sensor data including three-dimensional point cloud data from a sensor such as a depth camera, a LiDAR, a distance measurement sensor, or a stereo camera, and temporarily stores the sensor data in the sensor data accumulation unit 3111.

The clustering unit 3102 clusters a large number of three-dimensional point clouds accumulated in the three-dimensional point cloud accumulation unit 3111 using, for example, the technology disclosed in Patent Document 2, and expresses each cluster as a three-dimensional object including an ellipsoid as illustrated in FIG. 5. For example, in a case where the clustering unit 3102 performs clustering processing on the three-dimensional point cloud capturing the external environment as illustrated in FIG. 8, the three-dimensional point cloud is represented by a group of three-dimensional objects (ellipsoids) as illustrated in FIG. 9.

As illustrated in FIG. 6, the two-dimensional projection unit 3103 orthogonally projects each ellipsoid object constructed by the clustering unit 3102 onto a reference plane parallel to the ground to two-dimensionalize the ellipsoid object into an ellipsoid flat plate. For example, when the two-dimensional projection unit 3103 orthogonally projects a three-dimensional object (ellipsoid) representing an external environment as illustrated in FIG. 9 onto a reference plane, a two-dimensional projection image representing the two-dimensional object (ellipsoid flat plate) as illustrated in FIG. 10 can be obtained (The vicinity of the front is illustrated in an enlarged manner on the right side of FIG. 10).

Furthermore, when the two-dimensional projection unit 3103 projects a three-dimensional object on a reference plane, information necessary for height estimation among high dimension information of the object is held. Examples of the information necessary for the height estimation include the expected value and variance of the three-dimensional point cloud data included in each three-dimensional object, and the normal vector of the object.

As illustrated in FIG. 14, for example, the hidden surface removal unit 3104 uses the Z buffer 3105 to perform the hidden surface removal processing on the ellipsoid flat plate orthogonally projected onto the reference plane. Details of the hidden surface removal processing are as described in the first example.

The map construction unit 3106 constructs a two-dimensional environmental map (HeightMap) including height information by assigning height information to each point on the reference plane after the hidden surface removal processing on the basis of information (expected value, variance, normal vector, and the like) held for each ellipsoid flat plate. Specifically, the map construction unit 3106 approximates an ellipsoid object before projection corresponding to an ellipsoid plane to a plane, and linearly interpolates an expected value of height information at a query point in the ellipsoid flat plate to calculate the height information. For example, the expected value of the height estimated by linear interpolation from the low-dimensional projection image illustrated on the right side of FIG. 10 can be calculated to obtain a HeightMap as illustrated in FIG. 11. By color-coding each two-dimensional object on the basis of the calculated expected value of the height, it is easy to visually grasp the height information in the two-dimensional image. In the example illustrated in FIG. 11, since the shading of each two-dimensional object is expressed separately on the basis of the expected value of the height, it is easy to visually grasp the floor surface, the first step, and the second step near the front.

Furthermore, the map construction unit 3106 subjects variance in the thickness direction of the corresponding original three-dimensional object to low-dimensional projection onto the z axis to obtain the variance at the query points in the ellipsoid flat plate. For example, the map construction unit 3106 can obtain the calculation result of the variance illustrated in FIG. 12 from the low-dimensional projection image illustrated on the right in FIG. 10. A location with a large variance means a location with a low degree of reliability and a high risk when the robot traverses. In the example illustrated in FIG. 12, since the shading of each two-dimensional object is expressed separately on the basis of the magnitude of the variance, the variance is large in the vicinity of the step of the staircase or in a place where the staircase is hung, in other words, it can be seen that the cost of traversing is high.

The HeightMap is a map method widely used in robots that move in a non-planar environment such as legged robots. According to the thirteenth example, it is possible to efficiently construct the HeightMap by reducing the data amount and the operation amount.

C-14. Fourteenth Example

Heretofore, the first to thirteenth examples in which a two-dimensional environmental map is constructed by projecting sensor data mainly including a three-dimensional point cloud onto a two-dimensional reference plane have been mainly described. On the other hand, in item C-14, a description will be given of a fourteenth example in which a two-dimensional point cloud obtained from a two-dimensional sensor is linearly projected to construct a one-dimensional environmental map.

Figure 32:
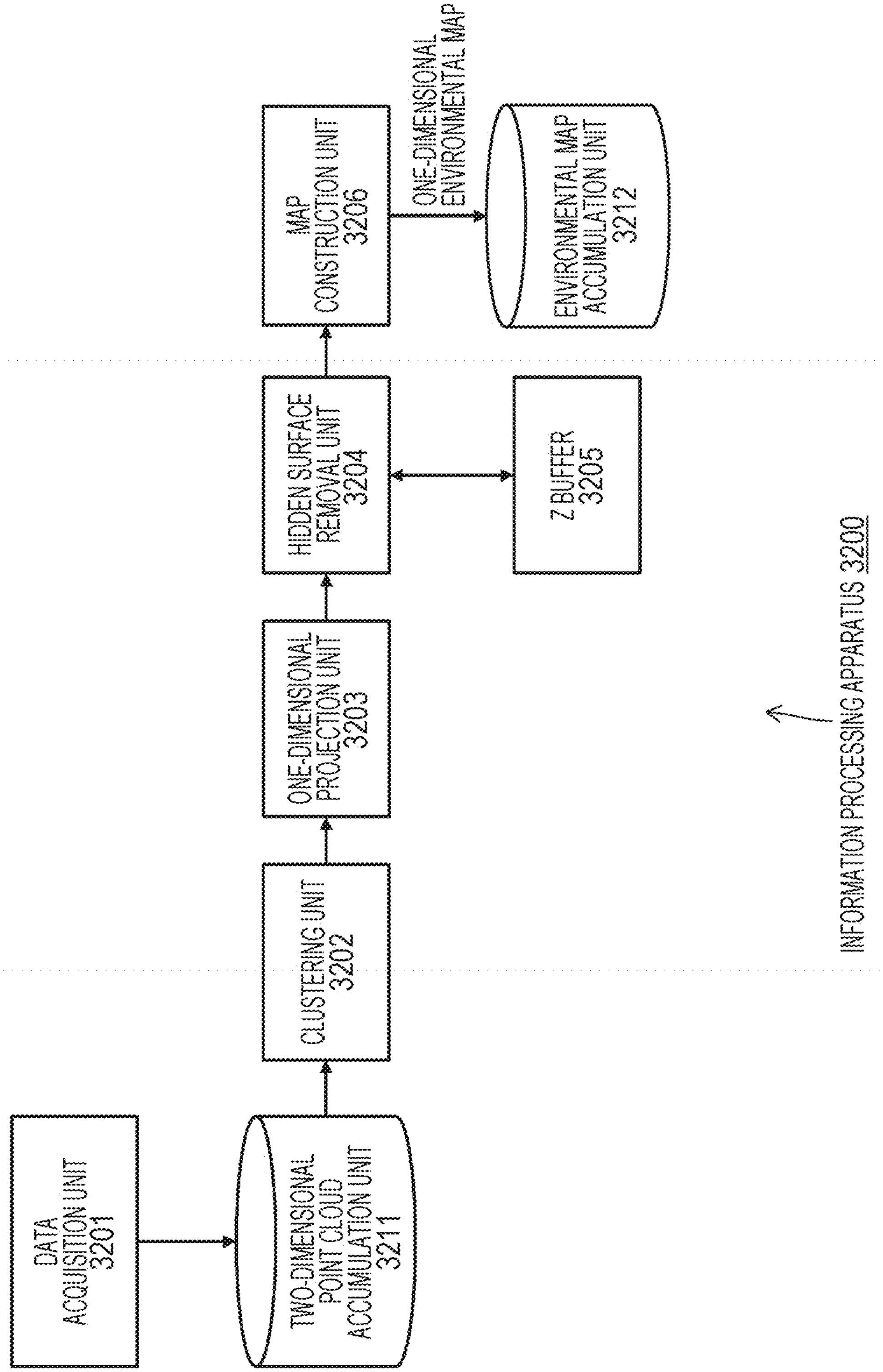
FIG. 32 is a diagram illustrating a functional configuration of an information processing apparatus 3200 according to a fourteenth example.

FIG. 32 illustrates a functional configuration of an information processing apparatus 3200 according to the fourteenth example. The illustrated information processing apparatus 3200 includes functional modules of a data acquisition unit 3201, a clustering unit 3202, a one-dimensional projection unit 3203, a hidden surface removal unit 3204, a Z buffer 3205, and a map construction unit 3206.

The data acquisition unit 3201 acquires sensor data from a two-dimensional sensor (not illustrated). The two-dimensional sensor is mounted, for example, so as to set the front or the traveling direction of the small robot as the viewing angle, and outputs sensor data including a two-dimensional point cloud that captures an obstacle or the like existing in front of the small robot. The two-dimensional point cloud data acquired by the data acquisition unit 3201 is temporarily stored in a sensor data accumulation unit 3211.

Figure 33:
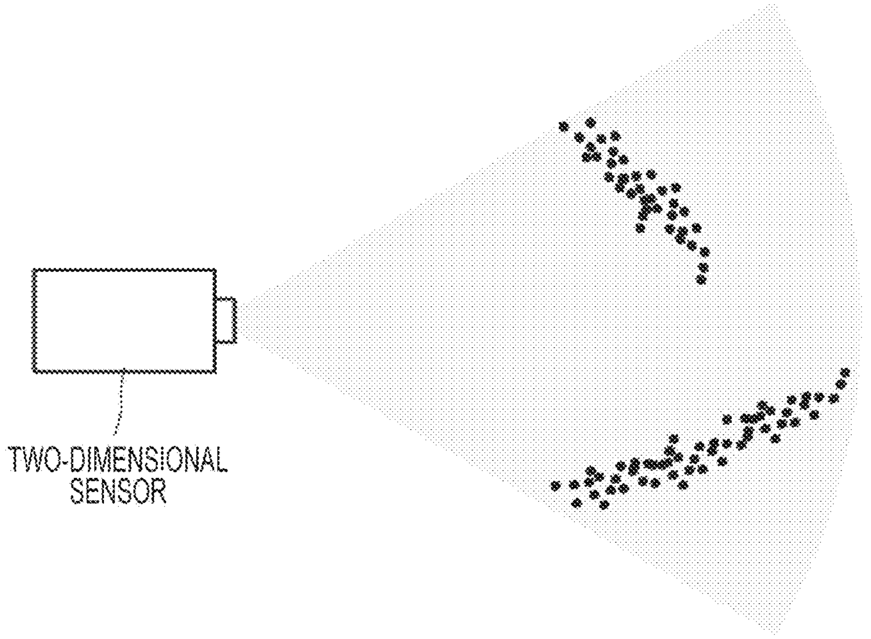
FIG. 33 is a diagram illustrating how a two-dimensional sensor senses a two-dimensional point cloud.
Figure 34:
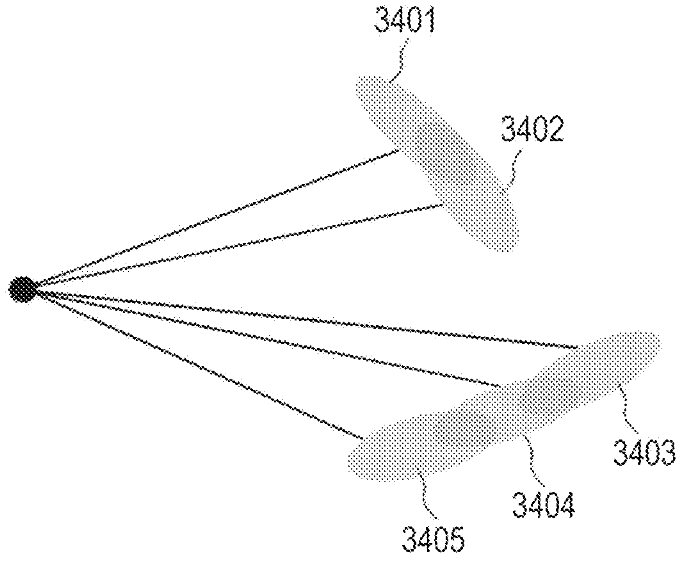
FIG. 34 is a diagram illustrating a state in which a two-dimensional object is constructed by clustering a two-dimensional point cloud.

The clustering unit 3202 clusters a large number of two-dimensional point clouds accumulated in the two-dimensional point cloud accumulation unit 3211 using, for example, the technology disclosed in Patent Document 2, and constructs a two-dimensional object from each cluster. The constructed two-dimensional object is an ellipse having an average u and a covariance Z of the two-dimensional point cloud in the cluster as geometric information. For example, in a case where the two-dimensional sensor senses a two-dimensional point cloud as illustrated in FIG. 33, the clustering unit 3202 clusters the two-dimensional point cloud to generate ellipsoid objects 3401 to 3405 as illustrated in FIG. 34.

Figure 35:
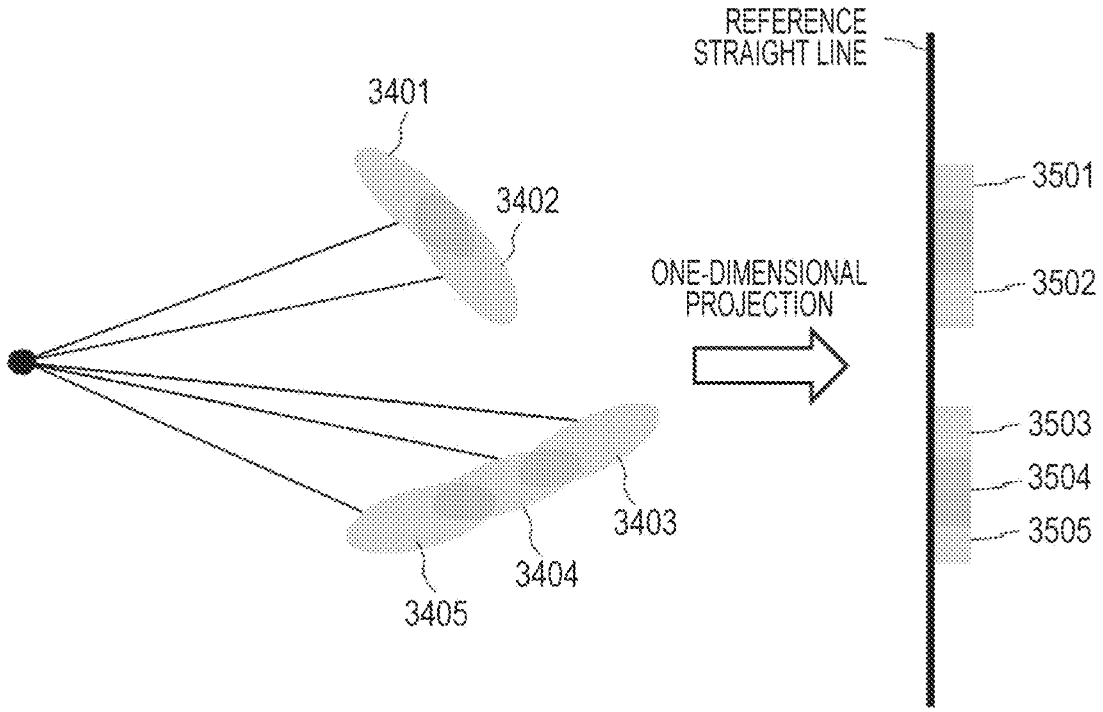
FIG. 35 is a diagram illustrating a state in which a two-dimensional object is one-dimensionally projected on a reference straight line.

The one-dimensional projection unit 3203 orthogonally projects each two-dimensional object constructed by the clustering unit 3202, for example, in a reference straight line orthogonal to the traveling direction of the small robot to make the two-dimensional object one-dimensional. FIG. 35 illustrates a result of obtaining line objects 3501 to 3501 by orthogonally projecting each of the ellipsoid objects 3401 to 3405 illustrated in FIG. 34 onto a reference straight line to make them one-dimensional.

Furthermore, when the one-dimensional projection unit 3203 projects the two-dimensional object on the reference straight line, information necessary for depth estimation among the two-dimensional information of the object is held. Examples of the information necessary for the depth estimation include the expected value and variance of the two-dimensional point cloud data included in each two-dimensional object, and the normal vector of the object.

When the one-dimensional projection unit 3203 orthogonally projects the plurality of two-dimensional objects onto the reference straight line to make the plurality of two-dimensional objects one-dimensional, the hidden surface removal unit 3204 performs processing of erasing a portion that becomes a shadow of another one-dimensional object from the viewpoint and cannot be seen. The Z buffer 3205 stores depth information of the two-dimensional object orthographically projected up to the previous time as a Z value for each pixel (alternatively, a region serving as a processing unit) of the reference straight line.

Then, when the one-dimensional projection unit 3203 orthogonally projects another two-dimensional object of the same pixel next time, the values of the depth stored in the Z buffer 3205 up to the previous time are compared with the values of the depth of the two-dimensional object orthogonally projected this time. If the current depth is smaller, the orthogonal projection processing of the current three-dimensional object onto the reference plane is performed, and the depth information of the pixel in the Z buffer 3205 is updated. On the other hand, if the current depth is larger, it is hidden behind the already orthographically projected two-dimensional object and cannot be seen, so that it is not necessary to newly perform orthographic projection processing on the reference straight line.

Figure 36:
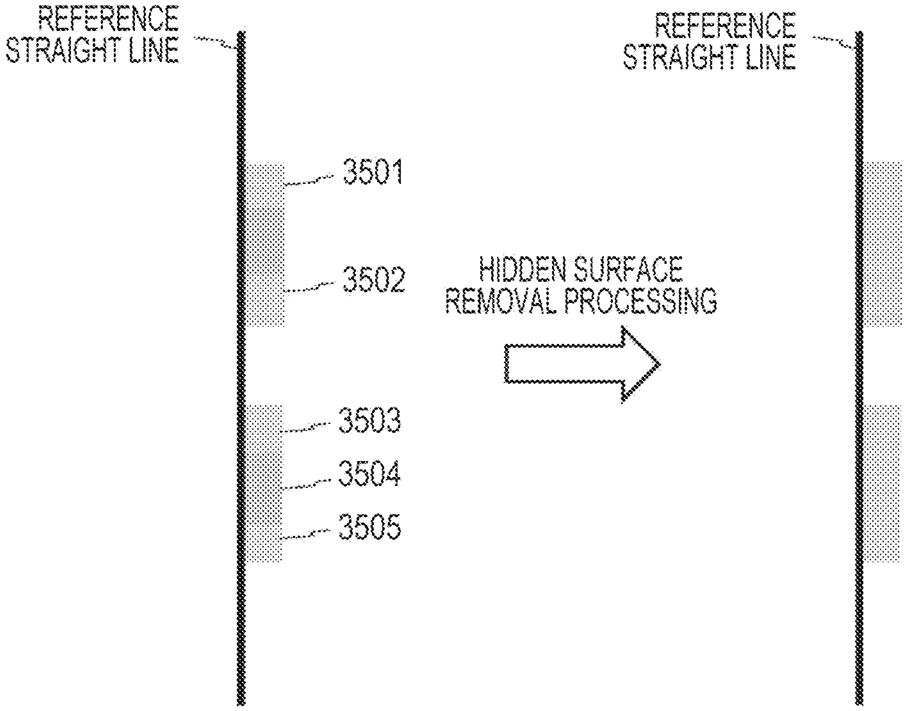
FIG. 36 is a diagram illustrating a reference straight line (one-dimensional environmental map) after the hidden surface removal processing.

FIG. 36 illustrates the reference straight line after the hidden surface removal processing. The map construction unit 3206 constructs a one-dimensional environmental map including height information by assigning depth information to each point on the reference straight line after the hidden surface removal processing on the basis of information (expected value, variance, normal vector, and the like) held for each ellipsoid flat plate. Specifically, the map construction unit 3206 approximates the two-dimensional ellipsoid object before projection corresponding to the painted dimensional object to a straight line, and performs linear interpolation on the expected value of the depth information at the query point in the ellipsoid flat plate to calculate the depth information. Furthermore, the map construction unit 3206 subjects variance in the thickness direction of the corresponding original two-dimensional object to low-dimensional projection in the depth direction to obtain the variance at the query points in the one-dimensional object.

As described above, according to the fourteenth example, it is possible to efficiently construct the one-dimensional environmental map with the depth information by reducing the data amount and the calculation amount. Conventionally, in order to acquire depth information, it has been necessary to perform a ray-cast process of firing a line (ray) invisible from the current position to the scheduled moving destination and determining whether there is a colliding object on the line. However, according to the fourteenth example, such a process is unnecessary. Furthermore, the one-dimensional environmental map with depth information constructed using the fourteenth example can be used for route planning of a robot that autonomously moves on a two-dimensional plane.

Figure 37:
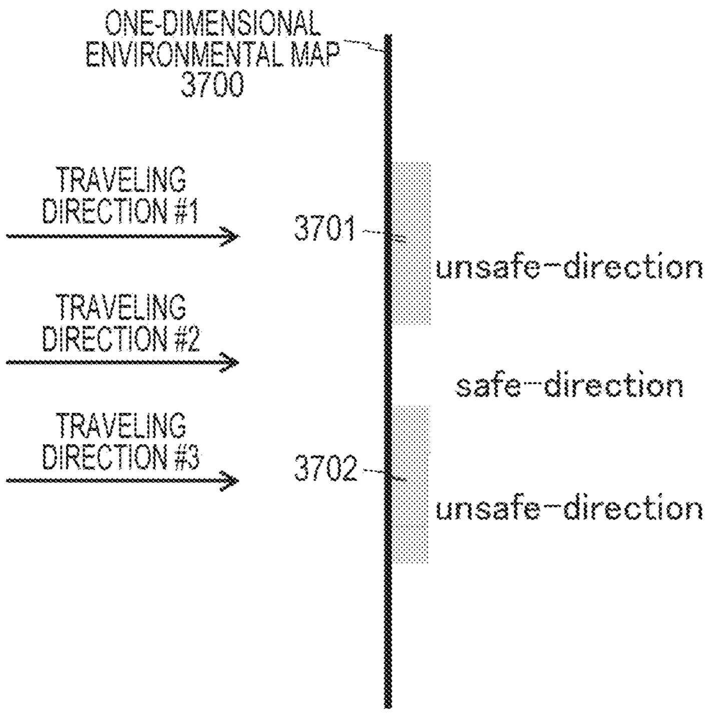
FIG. 37 is a diagram illustrating how a route of a robot is planned on the basis of a one-dimensional environmental map with depth information.

The robot can estimate the presence or absence of an obstacle in the traveling direction on the basis of the one-dimensional environmental map with depth information. For example, as illustrated in FIG. 37, on the one-dimensional environmental map 3700, it can be recognized that the traveling direction #2 in which the one-dimensional object does not exist is a safe direction in which there is no risk of collision with an obstacle, and it can be recognized that the traveling directions #1 and #3 in which the one-dimensional objects 3701 and 3702 exist are unsafe directions in which there is a possibility of collision with an obstacle.

D. APPLICATION EXAMPLE TO ROBOT

In this section, an example in which the information processing apparatus according to the present disclosure is applied to a robot will be described. As described above, since the information processing apparatus according to the present disclosure can create the environmental map by greatly reducing the data amount and the calculation amount, it is practically possible to mount the information processing apparatus on a small robot with limited calculation resources. The small robot can make a route plan using the created environmental map and autonomously perform movement work on the basis of the route plan.

D-1. Configuration Example of Robot

Figure 38:
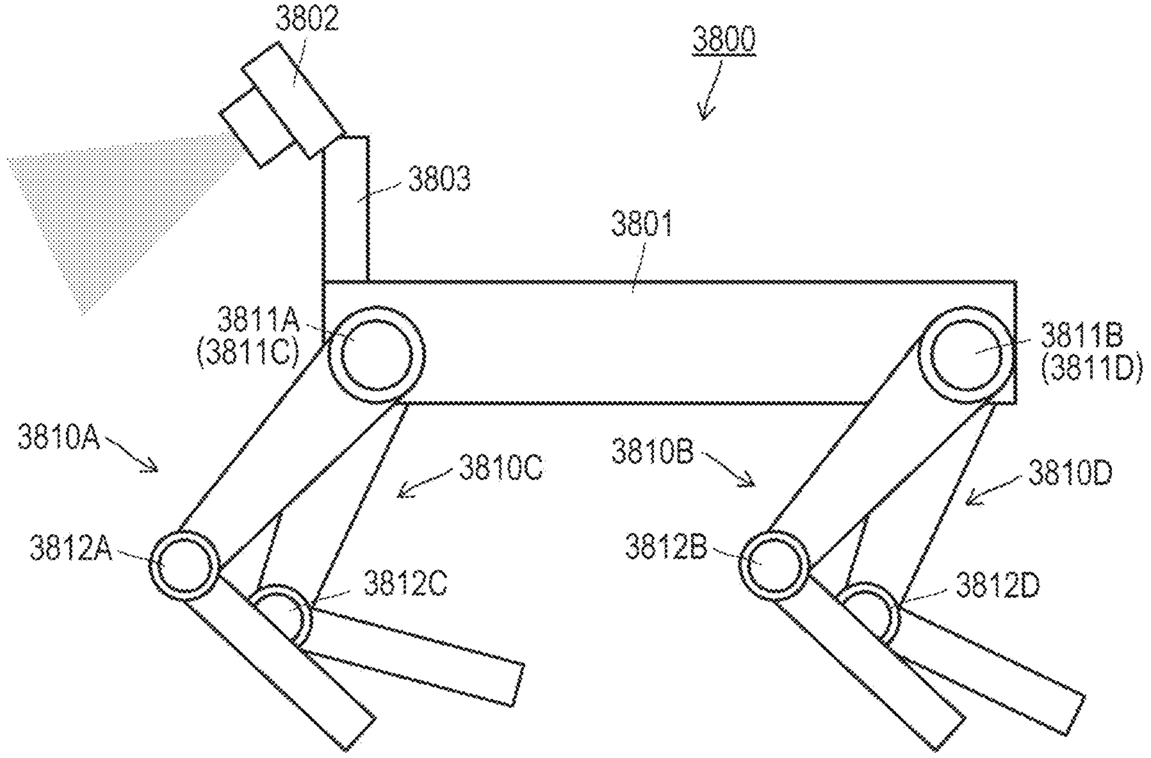
FIG. 38 is a diagram illustrating a configuration example of a robot device 3800.

FIG. 38 schematically illustrates a configuration example of a robot device 3800 to which the present disclosure is applied. The illustrated robot device 3800 includes a main body 3801, a visual sensor 3802, a joint 3803, and four legs 3810A to D.

The visual sensor 3802 is a sensor that visually recognizes the environment around the robot device 3800, and includes, for example, at least one of a camera (including a stereo camera), an infrared camera, a time of flight (TOF) sensor, a LiDAR, and the like, and outputs sensor data including, for example, a three-dimensional point cloud. The visual sensor 3802 is attached to the main body 3801 via the joint 3803 for moving a line-of-sight direction of the visual sensor 3802 up, down, left, and right. Furthermore, the robot device 3800 may include a sensor other than the visual sensor 3802, such as an inertial measurement unit (IMU) mounted on the main body 3801 or each of the legs 3810A to D, a ground sensor of the sole of each of the legs 3810A to D, or a tactile sensor of a surface of the main body 3801.

The legs 3810A to D as a moving means are connected to the main body 3801 via joints 3811A to D corresponding to hip joints, respectively. Each of legs 3810A to D includes joints 3812A to D that connect the thigh link and the lower leg link. Each of the joints 3811A to D and the joints 3812A to D has at least a degree of freedom around the pitch. The joints 3811A to D and the joints 3812A to D are active joints, and include a motor for driving a joint, an encoder for detecting a position of the motor, a speed reducer, and a torque sensor for detecting torque on an output shaft side of the motor (none of them are illustrated). Therefore, the robot device 3800 is a four-legged robot in which a gait by a leg (walking) is selectable.

Figure 39:
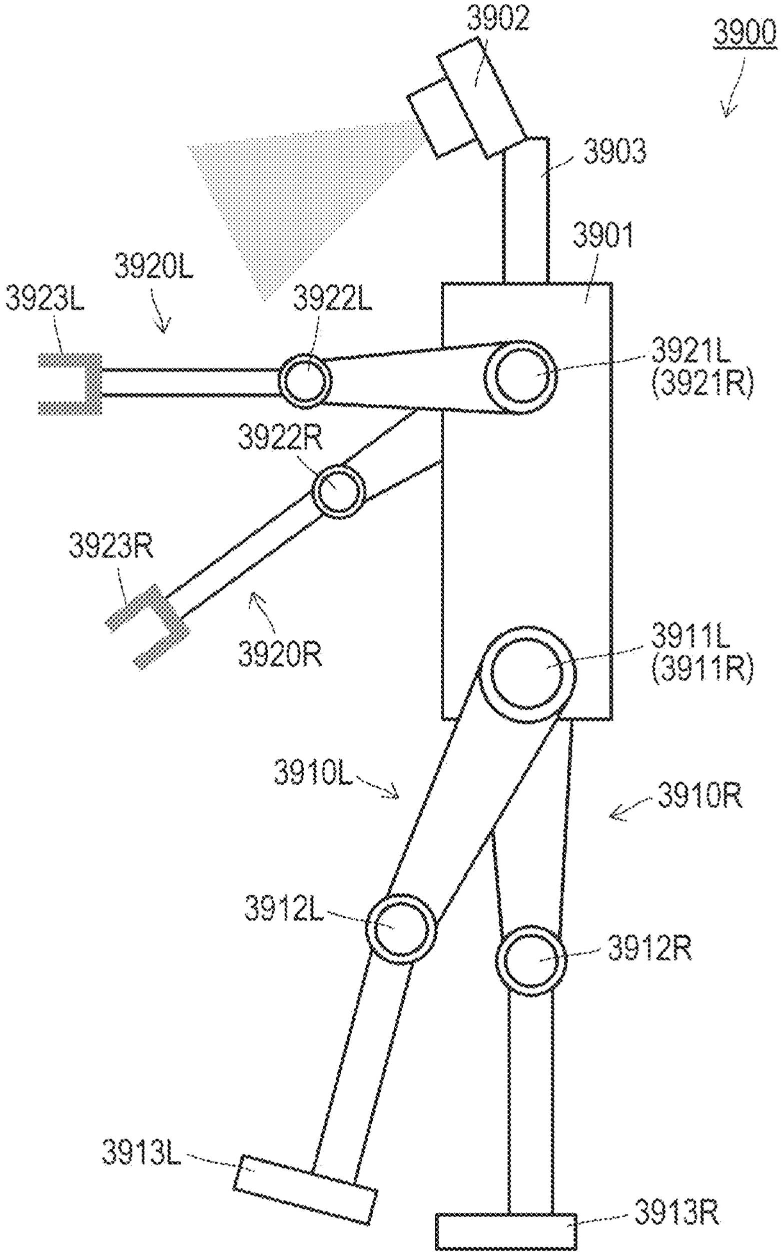
FIG. 39 is a diagram illustrating a configuration example of a robot device 3900.

Furthermore, FIG. 39 schematically illustrates a configuration example of a robot device 3900 to which the present disclosure is applied. The robot device 3900 includes a main body 3901, a visual sensor 3902, a joint 3903, two legs of a right leg 3910R and a left leg 3910L, and a right arm 3920R and a left arm 3920L.

The visual sensor 3902 is a sensor that visually recognizes the environment around the robot device 3900, and includes, for example, at least one of a camera (including a stereo camera), an infrared camera, a TOF sensor, a LiDAR, and the like, and outputs sensor data including, for example, a three-dimensional point cloud. The visual sensor 3902 is attached to the main body 3901 via a joint 3903 for moving the line-of-sight direction of the visual sensor 3902 up, down, left, and right.

The right leg 3910R and the left leg 3910L as moving means are connected to the lower end of the main body 3901 via joints 3911R and 3911L corresponding to the hip joints, respectively. Right leg 3910R and left leg 3910L respectively include joints 3912R and 3912L corresponding to a knee joint connecting the thigh link and the lower leg link, and ground contact portions (or foot portions) 3913R and 3913L at the distal end of the lower leg link.

The right arm 3920R and the left arm 3920L are connected to the vicinity of the upper end of the main body 3901 via joints 3921R and 3921L corresponding to shoulder joints, respectively. The right arm 3920R and the left arm 3920L respectively include joints 3922R and 3922L corresponding to elbow joints connecting the upper arm link and the forearm link, and hands (or grips) 3923R and 3923L at the tip of the forearm link.

The joints 3911R and 3911L, the joints 3912R and 3912L, the joints 3921R and 3921L, and the joints 3922R and 3922L include a motor for driving a joint, an encoder for detecting a position of the motor, a speed reducer, and a torque sensor for detecting torque on an output shaft side of the motor (none of them are illustrated).

D-2. Robot Control System

Figure 40:
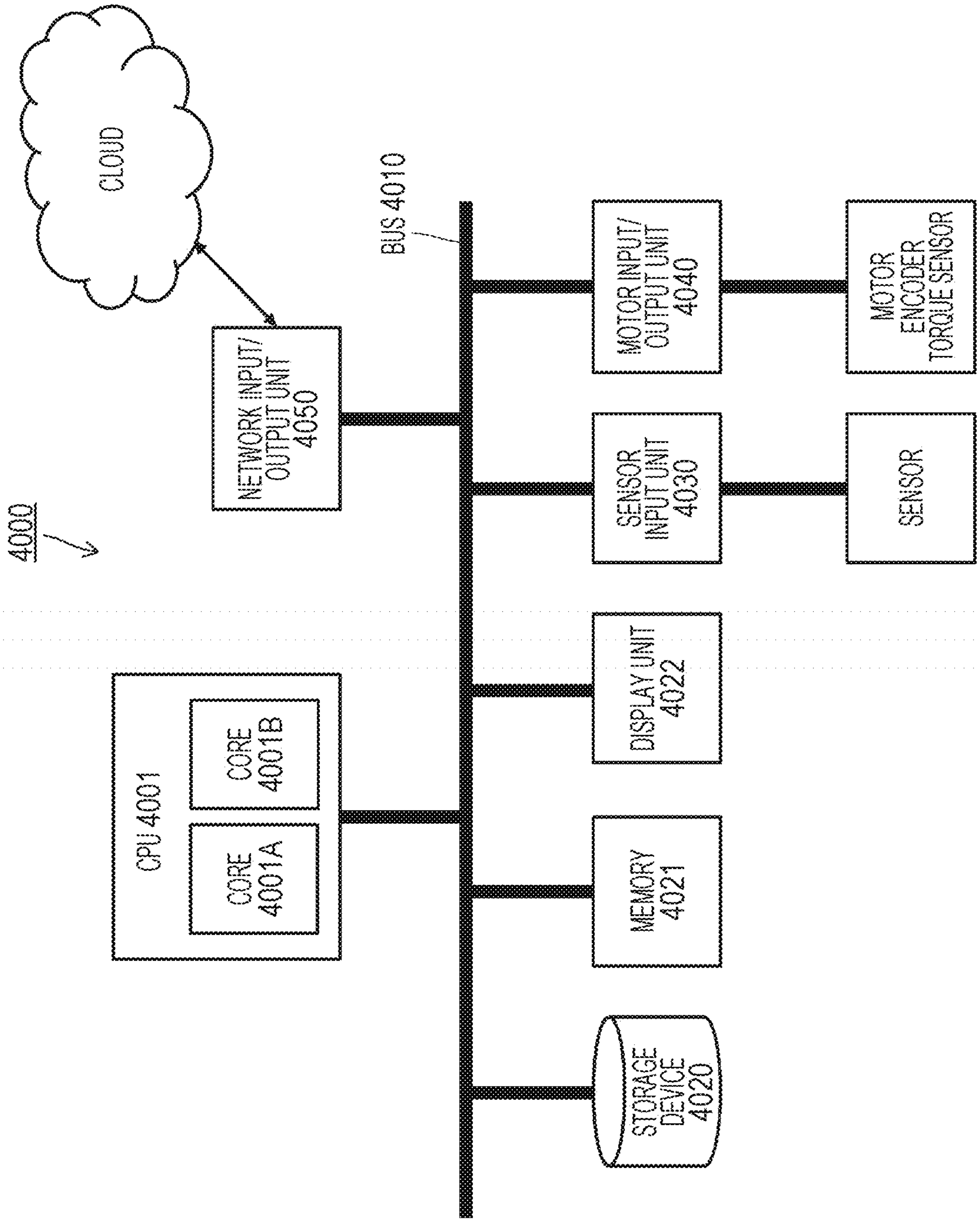
FIG. 40 is a diagram illustrating a configuration example of a control system 4000.

FIG. 40 illustrates a configuration example of a control system 4000 of the robot device 3800. Some or all of the components of the control system 4000 are built in the main body 3801. Alternatively, the control system 4000 is a device physically independent of the robot device 3800, and is connected to the robot device 3800 in a wireless or wired manner. For example, some or all components of the control system 4000 may be installed on a cloud and interconnected with the robot device 3800 via a network. Furthermore, it should be understood that the control system of the robot device 3900 has a similar configuration.

The control system 4000 operates under the overall control of a CPU 4001. In the illustrated example, the CPU 4001 has a multi-core configuration including a processor core 4001A and a processor core 4001B. The CPU 4001 is interconnected with each component in the control system 4000 via a bus 4010.

A storage device 4020 includes, for example, a large-capacity external storage device such as a hard disk drive (HDD) or a solid state drive (SSD), and stores files such as a program executed by the CPU 4001 and data generated by using or executing the program during execution. The CPU 4001 executes, for example, a device driver that drives a motor of each joint of the robot device 3800, a map construction program that constructs an environmental map on the basis of three-dimensional point data acquired from the visual sensor 3802, a route planning program that plans a route of the robot device 3800 on the basis of the environmental map, and the like.

A memory 4021 includes a read only memory (ROM) and a random access memory (RAN). The ROM stores, for example, a startup program and a basic input/output program of the control system 4000. The RAM is used for loading a program to be executed by the CPU 4001 and temporarily storing data to be used during execution of the program.

A display unit 4022 includes, for example, a liquid crystal display or an organic electro luminescence (EL) display. The display unit 4022 displays data and an execution result during execution of the program by the CPU 4001. For example, sensor data including a three-dimensional point cloud acquired from a sensor, an environmental map constructed from the three-dimensional point cloud, information regarding a movement route of the robot device 3800 planned on the basis of the environmental map, a search situation of the planned route, and the like are displayed on the display unit 4022.

A sensor input unit 4030 performs signal processing for taking sensor signals from various sensors mounted on the robot device 3800, such as the visual sensor 3802, into the control system 4000. A motor input/output unit 4040 performs input/output processing of a signal with each motor, such as outputting a command signal to the motor of each joint of the robot device 3800 and inputting a sensor signal of an encoder for detecting the position of the motor or a torque sensor on a side of an output shaft of the motor. A network input/output unit 4050 performs input/output processing between the control system 4000 and the cloud.

Figure 41:
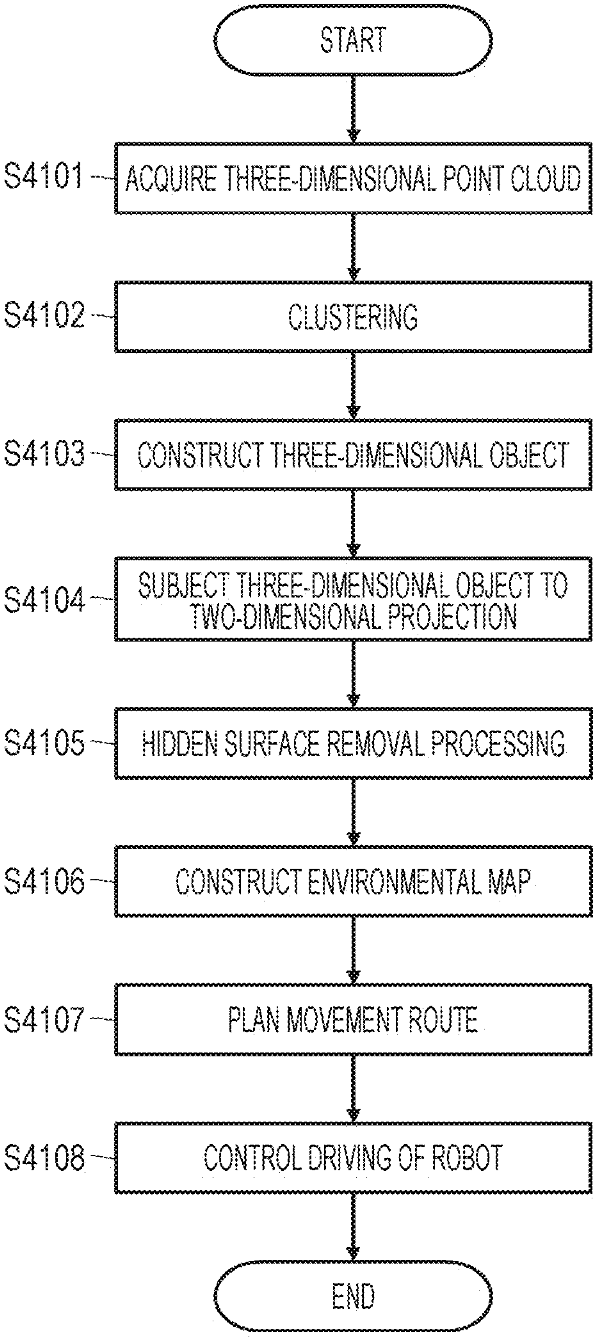
FIG. 41 is a flowchart illustrating a processing procedure for controlling the movement of the robot device 3800.

FIG. 41 illustrates a processing procedure for controlling the movement of the robot device 3800 in the control system 4000 in the form of a flowchart. It is assumed that the movement control of the robot device 3900 is also realized by a similar processing procedure.

First, the CPU 4001 acquires sensor data including a three-dimensional point cloud from the sensor via the sensor input unit 4030 (step S4101).

Next, the CPU 4001 executes the environmental map construction program, and constructs an environmental map (step S4106) through clustering of a three-dimensional point cloud (step S4102), construction of a three-dimensional object (step S4103), two-dimensional projection (step S4104), and hidden surface removal processing (step S4105).

Next, the CPU 4001 plans a movement route of the robot device 3800 on the basis of the constructed environmental map (step S4107).

Then, the CPU 4001 controls driving of the motor of the active joint of each movable leg so that the robot device 3800 moves according to the planned route (step S4108).

INDUSTRIAL APPLICABILITY

The present disclosure has been described in detail with reference to a specific embodiment. However, it is obvious that those skilled in the art can make modifications and substitutions of the embodiment without departing from the scope of the present disclosure.

In the present specification, an embodiment has been mainly described in which the amount of data and the amount of computation when the environmental map is created by applying the present disclosure to a small robot having limited computation resources are reduced, but the gist of the present disclosure is not limited thereto. Of course, the present disclosure can also be similarly applied to a case where an environmental map is created on a high-performance computing system equipped with a high-performance processor and a large-capacity memory system or on a cloud.

Furthermore, in the present specification, an embodiment of creating a (2.5 dimensional) environmental map including height information mainly from three-dimensional sensor data has been mainly described, but the present disclosure can be generally applied to a case of creating a low-dimensional environmental map from high-dimensional sensor data.

The method of creating an environmental map according to the present disclosure can be applied to various types of autonomous mobile devices such as small robots, automatic conveyance vehicles, and unmanned aerial vehicles such as drones.

In short, the present disclosure has been described in an illustrative manner, and the contents disclosed in the present specification should not be interpreted in a limited manner. To determine the subject matter of the present disclosure, the claims should be taken into consideration.

Note that the present disclosure may also have the following configurations.

(1) An information processing apparatus including:

an object construction unit that clusters sensor data including a high-dimensional point cloud and constructs a high-dimensional object on a basis of geometric information extracted from a cluster;

a projection unit that subjects the high-dimensional object to low-dimensional projection; and a map construction unit that constructs a map on a basis of an object that has been subjected to the low-dimensional projection.

(1-1) The information processing apparatus according to (1) described above, further including a data acquisition unit that acquires sensor data from a sensor.

(1-2) The information processing apparatus according to (1-1) described above, in which the sensor is any one of a depth sensor, a distance measurement sensor, a LiDAR, and a stereo sensor.

(2) The information processing apparatus according to (1) described above, in which the object construction unit constructs a high-dimensional object having geometric information extracted from a set of sensor data included in a cluster.

(2-1) The information processing apparatus according to (2) described above, in which the object construction unit constructs a high-dimensional object having a size, a shape, and a posture based on the geometric information.

(2-2) The information processing apparatus according to (2) described above, in which the object construction unit constructs an ellipsoid object based on an average p and a covariance Z obtained by performing principal component analysis on a set of sensor data included in the cluster.

(3) The information processing apparatus according to any one of (1) and (2) described above, in which the projection unit orthogonally projects the high-dimensional object onto a reference plane parallel to a ground to generate a low-dimensional object, and the map construction unit constructs a low-dimensional map on a basis of the object.

(3-1) The information processing apparatus according to (3) described above, in which when the projection unit subjects the high-dimensional object to low-dimensional projection, information necessary for height estimation of each point on the reference plane among high-dimensional information of the object is held, and a height estimated on the basis of the information is assigned to each point on the reference plane to construct an environmental map.

(4) The information processing apparatus according to any one of (1) to (3) described above, further including a hidden surface removal unit that performs hidden surface removal processing on the object that has been subjected to the low-dimensional projection by the projection unit.

(5) The information processing apparatus according to (4) described above, in which the hidden surface removal unit performs the hidden surface removal processing using a Z buffer that stores height information or an index of the height information.

(6) The information processing apparatus according to (5) described above, in which the hidden surface removal unit limits a region to be processed on the Z buffer by a bounding box obtained for a high-dimensional object.

(7) The information processing apparatus according to any one of (4) to (6) described above, in which the hidden surface removal unit performs the hidden surface removal processing in an order in which high-dimensional objects are sorted in a height direction.

(8) The information processing apparatus according to (5) or (6) described above, in which the hidden surface removal unit uses an incremental method for height calculation in the Z buffer.

(9) The information processing apparatus according to (5) or (6) described above, in which the hidden surface removal unit divides the Z buffer into tiles and executes height calculation for each tile on the same memory.

(10) The information processing apparatus according to (5) or (6) described above, in which the hidden surface removal unit divides the Z buffer into tiles and simultaneously executes height calculations of a plurality of the tiles.

(11) The information processing apparatus according to any one of (4) to (10) described above, further including a filter processing unit that performs processing of filling or processing of smoothing a gap existing between low-dimensional objects after the hidden surface removal processing.

(12) The information processing apparatus according to any one of (1) to (11) described above, in which the object construction unit clusters sensor data including a three-dimensional point cloud, and constructs an ellipsoid object based on an average p and a covariance Z of the three-dimensional point cloud included in a cluster.

(13) The information processing apparatus according to (12) described above, in which the projection unit orthogonally projects the ellipsoid object onto a reference plane parallel to a ground to generate a two-dimensional object including an ellipsoid flat plate.

(14) The information processing apparatus according to (13) described above, in which the projection unit extracts a normal component of the ellipsoid object as information indicating uncertainty of an original three-dimensional point cloud when the ellipsoid object is projected, and the map construction unit constructs a map to which information indicating uncertainty of each two-dimensional object is assigned.

(14-1) The information processing apparatus according to (14) described above, in which the map construction unit color-codes and expresses the two-dimensional object on the basis of a size of the normal component of the ellipsoid object before projection.

(15) The information processing apparatus according to any one of (1) to (14) described above, in which the projection unit holds information necessary for height estimation among high-dimensional information of an object when the projection unit subjects the high-dimensional object to low dimensional projection, and the map construction unit constructs an environmental map to which a height estimated on the basis of the held information is assigned.

(16) The information processing apparatus according to (15) described above, in which the map construction unit estimates a height of each point on a low-dimensional projection image on the basis of an expected value at a corresponding point of the high-dimensional object before projection.

(17) The information processing apparatus according to (15) or (16) described above, in which the map construction unit subjects variance in a thickness direction at corresponding points of the high-dimensional object before projection to low-dimensional projection to calculate variance of each point on a low-dimensional projection image, and constructs the environmental map to which information on reliability based on the variance is further added.

(18) The information processing apparatus according to (1) described above, in which the object construction unit clusters a two-dimensional point cloud and constructs a two-dimensional object on the basis of geometric information extracted from a cluster, the projection unit subjects the two-dimensional object to one-dimensional projection, and the map construction unit constructs a one-dimensional map with depth information on the basis of an object that has been subjected to the one-dimensional projection.

(19) An information processing method including:

an object construction step of clustering sensor data including a high-dimensional point cloud and constructing a high-dimensional object on a basis of geometric information extracted from a cluster;

a projection step of subjecting the high-dimensional object to low-dimensional projection; and a map construction step of constructing a map on a basis of an object that has been subjected to the low-dimensional projection.

(20) A mobile device including:

a main body;

a moving unit that moves the main body;

a sensor mounted on the main body;

a map construction unit that constructs an environmental map on the basis of sensor data from the sensor;

a route planning unit that plans a route on the basis of the environmental map; and a control unit that controls an operation of the moving unit on the basis of the planned route, in which the map construction unit clusters the sensor data including a high-dimensional point cloud, and constructs a map on the basis of an object obtained by reducing a dimension of a high-dimensional object constructed on the basis of geometric information extracted from a cluster.

REFERENCE SIGNS LIST

100 Information processing apparatus
101 Data acquisition unit
102 Object construction unit
103 Geometric information extraction unit
104 Projection unit
105 Map construction unit
111 Sensor data accumulation unit
112 Environmental map accumulation unit
1300 Information processing apparatus
1301 Data acquisition unit
1302 Object construction unit
1303 Geometric information extraction unit
1304 Projection unit
1305 Hidden surface removal unit
1306 Z buffer
1307 Map construction unit
1311 Sensor data accumulation unit
1312 Environmental map accumulation unit
2200 Information processing apparatus
2201 Data acquisition unit
2202 Object construction unit
2203 Geometric information extraction unit
2204 Projection unit
2205 Hidden surface removal unit
2206 Z buffer
2207 Post filter processing unit
2208 Map construction unit
2211 Sensor data accumulation unit
2212 Environmental map accumulation unit
2500 Information processing apparatus
2501 Data acquisition unit
2502 Clustering unit
2503 Two-dimensional projection unit
2504 Hidden surface removal unit
2505 Z buffer
2506 Map construction unit
2511 Three-dimensional point cloud accumulation unit
2512 Environmental map accumulation unit
2600 Information processing apparatus
2601 Data acquisition unit
2602 Clustering unit
2603 Two-dimensional projection and normal component extraction unit
2604 Hidden surface removal unit
2605 Z buffer
2606 Map construction unit
2611 Three-dimensional point cloud accumulation unit
2612 Environmental map accumulation unit
2900 Information processing apparatus
2901 Data input unit
2902 Guided filter
2903 Depth calculation unit
2904 Environmental map construction unit
2905 Guide generation unit
2906 Three-dimensional environmental map accumulation unit
3001 Clustering unit
3002 Two-dimensional projection unit
3003 Hidden surface removal unit
3004 Z buffer
3100 Information processing apparatus
3101 Data acquisition unit
3102 Clustering unit
3103 Two-dimensional projection unit
3104 Hidden surface removal unit
3105 Z buffer
3106 Map construction unit
3111 Three-dimensional point cloud accumulation unit
3112 Environmental map accumulation unit
3200 Information processing apparatus
3201 Data acquisition unit
3202 Clustering unit
3203 Two-dimensional projection unit
3204 Hidden surface removal unit
3205 Z buffer
3206 Map construction unit
3211 Two-dimensional point cloud accumulation unit
3212 Environmental map accumulation unit
3800 Robot device
3801 Main body
3802 Visual sensor
3803 Joint
3810A to D Leg
3811A to D Joint
3900 Robot device
3901 Main body
3902 Visual sensor
3903 Joint
3910R Right leg
3910L Left leg
3911R, 3911L Joint (hip joint)
3912R, 3912L Joint (knee joint)
3913R, 3913L Ground contact portion (foot portion)
3920R Right arm
3920L Left arm
3921R, 3921L Joint (shoulder joint)
3922R, 3922L Joint (elbow joint)
3923R, 3923L Grip portion (hand portion)
4000 Control system

4001 CPU
4001A, 4001B Processor core
4010 Bus
4020 Storage device
4021 Memory
4022 Display unit
4030 Sensor input unit
4040 Motor input/output unit
4050 Network input/output unit

The invention claimed is:

1. An information processing apparatus, comprising:
a central processing unit (CPU) configured to:
generate a plurality of clusters based on sensor data including a plurality of high-dimensional point clouds;
construct a plurality of high-dimensional objects based on the generated plurality of clusters of the plurality of high-dimensional point clouds;
subject the plurality of high-dimensional objects to low-dimensional projection;
generate a plurality of low-dimensional objects based on the subjection of the plurality of high-dimensional objects to the low-dimensional projection;
perform a hidden surface removal process on the plurality of low-dimensional objects;
average the plurality of low-dimensional objects;
obtain a first object based on the average of the plurality of low-dimensional objects;
perform a filling process, by use of the obtained first object, to fill gaps between the plurality of low-dimensional objects after the hidden surface removal process; and
construct a first map, after the filling process, based on the plurality of low-dimensional objects.

2. The information processing apparatus according to claim 1, wherein the CPU is further configured to:
extract, from the plurality of high-dimensional point clouds, geometric information of the plurality of high-dimensional objects; and
construct the plurality of high-dimensional objects based on the extracted geometric information of the plurality of high-dimensional objects.

3. The information processing apparatus according to claim 1, wherein
the CPU is further configured to orthogonally project the plurality of high-dimensional objects onto a reference plane, and
the reference plane is parallel to a ground.

4. The information processing apparatus according to claim 1, further comprising a Z buffer, wherein
the CPU is further configured to perform the hidden surface removal process by use of the Z buffer, and
the Z buffer is configured to store one of height information or an index of the height information.

5. The information processing apparatus according to claim 4, wherein the CPU is further configured to:
obtain a bounding box for a high-dimensional object of the plurality of high-dimensional objects; and
limit a region to be processed on the Z buffer by use of the obtained bounding box.

6. The information processing apparatus according to claim 1, wherein the CPU is further configured to:
sort the plurality of high-dimensional objects in a height direction; and
perform the hidden surface removal process in an order in which the plurality of high-dimensional objects are sorted in the height direction.

7. The information processing apparatus according to claim 4, wherein the CPU is further configured to use an incremental method for height calculation in the Z buffer.

8. The information processing apparatus according to claim 4, wherein the CPU is further configured to:
divide the Z buffer into a plurality of tiles; and
execute height calculation for each tile of the plurality of tiles on a same memory.

9. The information processing apparatus according to claim 4, wherein the CPU is further configured to:
divide the Z buffer into a plurality of tiles; and
simultaneously execute height calculations of the plurality of the tiles.

10. The information processing apparatus according to claim 1, wherein the CPU is further configured to construct an ellipsoid object based on an average $\mu$ and a covariance $\Sigma$ of a three-dimensional point cloud of the plurality of high-dimensional point clouds.

11. The information processing apparatus according to claim 10, wherein the CPU is further configured to:
orthogonally project the ellipsoid object onto a reference plane, wherein the reference plane is parallel to a ground; and
generate a two-dimensional object including an ellipsoid flat plate based on the orthogonal projection of the ellipsoid object.

12. The information processing apparatus according to claim 11, wherein the CPU is further configured to:
extract, before the orthogonal projection of the ellipsoid object, a normal component of the ellipsoid object, wherein the normal component corresponds to information that indicates uncertainty of an original three-dimensional point cloud of the plurality of high-dimensional point clouds;
assign, based on the extracted normal component of the ellipsoid object, the information that indicates the uncertainty to the two-dimensional object that includes the ellipsoid flat plate; and
construct a second map based on the assigned information that indicates the uncertainty of the two-dimensional object.

13. The information processing apparatus according to claim 1, wherein the CPU is further configured to:
hold, before projection of a high-dimensional object of the plurality of high-dimensional objects to the low-dimensional projection, information for height estimation among high-dimensional information of the high-dimensional object;
assign the held information to a low-dimensional object of the plurality of low-dimensional objects; and
construct the first map based on the assignment of the held information to the low-dimensional object.

14. The information processing apparatus according to claim 13, wherein the CPU is further configured to estimate a height of each point on the low-dimensional object based on an expected value at a corresponding point of the high-dimensional object.

15. The information processing apparatus according to claim 13, wherein the CPU is further configured to:
subject, before the projection of the high-dimensional object to the low dimensional projection, variance in a thickness direction at corresponding points of the high-dimensional object;
calculate variance of each point on the low-dimensional object based on the subjected variance in the thickness direction at the corresponding points of the high-dimensional object; and
construct the first map based on the calculated variance.

16. The information processing apparatus according to claim 1, wherein the CPU is further configured to:

generate a cluster based on a two-dimensional point cloud, wherein the cluster is different from the plurality of clusters, and the two-dimensional point cloud is different from the plurality of high-dimensional point clouds;

extract geometric information from the two-dimensional point cloud corresponding to the generated cluster;

construct a two-dimensional object based on the extracted geometric information;

subject the two-dimensional object to one-dimensional projection;

generate a second object based on the subjection of the two-dimensional object to the one-dimensional projection; and construct, based on the generated second, a one-dimensional map with depth information object.

17. An information processing method, comprising:

generating a plurality of clusters based on sensor data including a plurality of high-dimensional point clouds;

constructing a plurality of high-dimensional objects based on the generated plurality of clusters of the plurality of high-dimensional point clouds;

subjecting the plurality of high-dimensional objects to low-dimensional projection;

generating a plurality of low-dimensional objects based on the subjection of the plurality of high-dimensional objects to the low-dimensional projection;

performing a hidden surface removal process on the plurality of low-dimensional objects;

averaging the plurality of low-dimensional objects;

obtaining an object based on the average of the plurality of low-dimensional objects;

performing a filling process, by use of the obtained object, to fill gaps between the plurality of low-dimensional objects after the hidden surface removal process; and constructing a map, after the filling process, based on the plurality of low-dimensional objects.

18. A mobile device, comprising:

a main body;

a device driver configured to move the main body;

a sensor mountable on the main body, wherein the sensor is configured to acquire sensor data including a plurality of high-dimensional point clouds; and a central processing unit (CPU) configured to:

acquire, from the sensor, the sensor data including the plurality of high-dimensional point clouds;

generate a plurality of clusters based on the acquired sensor data including the plurality of high-dimensional point clouds;

construct a plurality of high-dimensional objects based on the generated plurality of clusters of the plurality of high-dimensional point clouds;

subject the plurality of high-dimensional objects to low-dimensional projection;

generate a plurality of low-dimensional objects based on the subjection of the plurality of high-dimensional objects to the low-dimensional projection;

perform a hidden surface removal process on the plurality of low-dimensional objects;

average the plurality of low-dimensional objects;

obtain an object based on the average of the plurality of low-dimensional objects;

perform a filling process, by use of the obtained object, to fill gaps between the plurality of low-dimensional objects after the hidden surface removal process;

construct an environmental map, after the filling process, based on the plurality of low-dimensional objects;

plan a route on based on the constructed environmental map; and control an operation of the device driver based on the planned route.

* * * * *